(12) United States Patent
Jordan et al.

(10) Patent No.: US 10,257,576 B2
(45) Date of Patent: Apr. 9, 2019

(54) GLOBAL SPEECH USER INTERFACE

(71) Applicant: Promptu Systems Corporation, Menlo Park, CA (US)

(72) Inventors: Adam Jordan, El Cerrito, CA (US); Scott Lynn Maddux, San Francisco, CA (US); Tim Plowman, Berkeley, CA (US); Victoria Stanbach, Santa Cruz, CA (US); Jody Williams, San Carlos, CA (US)

(73) Assignee: PROMPTU SYSTEMS CORPORATION, Menlo Park, CA (US)

( * ) Notice: Subject to any disclaimer, the term of this patent is extended or adjusted under 35 U.S.C. 154(b) by 0 days.

(21) Appl. No.: 15/392,994

(22) Filed: Dec. 28, 2016

(65) Prior Publication Data

US 2017/0111702 A1    Apr. 20, 2017

Related U.S. Application Data

(60) Continuation of application No. 14/572,596, filed on Dec. 16, 2014, now Pat. No. 9,848,243, which is a
(Continued)

(51) Int. Cl.
*H04N 21/47* (2011.01)
*G06F 3/16* (2006.01)
(Continued)

(52) U.S. Cl.
CPC ............. *H04N 21/47* (2013.01); *G06F 3/16* (2013.01); *G06Q 30/0271* (2013.01);
(Continued)

(58) Field of Classification Search
None
See application file for complete search history.

(56) References Cited

U.S. PATENT DOCUMENTS 5,199,080 A    3/1993 Kimura et al.
5,226,090 A *  7/1993 Kimura .................. G10L 15/22
                                                  348/734
(Continued)

FOREIGN PATENT DOCUMENTS

DE    19649069 A1    6/1998
EP    0921508 A2     6/1999
(Continued)

OTHER PUBLICATIONS

Witbrock et al., "Speech Recognition for a Digital Video Library" Journal of the American Society for Information Science, 49(7), May 15, 1998, pp. 619-632, John Wiley & Sons, Inc., U.S.A.
(Continued)

*Primary Examiner* — Samira Monshi
(74) *Attorney, Agent, or Firm* — Edward J. Radlo; Radlo IP Law Group

(57) ABSTRACT

A global speech user interface (GSUI) comprises an input system to receive a user's spoken command, a feedback system along with a set of feedback overlays to give the user information on the progress of his spoken requests, a set of visual cues on the television screen to help the user understand what he can say, a help system, and a model for navigation among applications. The interface is extensible to make it easy to add new applications.

14 Claims, 13 Drawing Sheets

Related U.S. Application Data continuation of application No. 14/029,729, filed on Sep. 17, 2013, now Pat. No. 8,983,838, which is a division of application No. 13/786,998, filed on Mar. 6, 2013, now Pat. No. 8,818,804, which is a division of application No. 13/179,294, filed on Jul. 8, 2011, now Pat. No. 8,407,056, which is a continuation of application No. 11/933,191, filed on Oct. 31, 2007, now Pat. No. 8,005,679, which is a division of application No. 10/260,906, filed on Sep. 30, 2002, now Pat. No. 7,324,947.

(60) Provisional application No. 60/327,207, filed on Oct. 3, 2001.

(51) Int. Cl.

| | | |
|---|---|---|
| *G10L 15/22* | (2006.01) | |
| *H04N 5/445* | (2011.01) | |
| *H04N 21/422* | (2011.01) | |
| *H04N 21/462* | (2011.01) | |
| *H04N 21/472* | (2011.01) | |
| *H04N 21/475* | (2011.01) | |
| *H04N 21/478* | (2011.01) | |
| *H04N 21/482* | (2011.01) | |
| *G10L 21/06* | (2013.01) | |
| *G06Q 30/02* | (2012.01) | |
| *G06Q 30/06* | (2012.01) | |
| *H04N 21/431* | (2011.01) | |
| *H04N 21/4782* | (2011.01) | |
| *H04N 21/4788* | (2011.01) | |
| *H04N 21/485* | (2011.01) | |
| *H04N 21/81* | (2011.01) | |
| *G10L 13/00* | (2006.01) | |

(52) U.S. Cl.
CPC .......... *G06Q 30/0631* (2013.01); *G10L 13/00* (2013.01); *G10L 15/22* (2013.01); *G10L 21/06* (2013.01); *H04N 5/44543* (2013.01); *H04N 21/4221* (2013.01); *H04N 21/42203* (2013.01); *H04N 21/4316* (2013.01); *H04N 21/4622* (2013.01); *H04N 21/472* (2013.01); *H04N 21/475* (2013.01); *H04N 21/478* (2013.01); *H04N 21/4781* (2013.01); *H04N 21/4782* (2013.01); *H04N 21/4788* (2013.01); *H04N 21/47202* (2013.01); *H04N 21/47211* (2013.01); *H04N 21/47214* (2013.01); *H04N 21/482* (2013.01); *H04N 21/4826* (2013.01); *H04N 21/4828* (2013.01); *H04N 21/4852* (2013.01); *H04N 21/812* (2013.01); *H04N 21/8173* (2013.01); *G10L 2015/221* (2013.01); *G10L 2015/223* (2013.01)

(56) References Cited

U.S. PATENT DOCUMENTS

| | | |
|---|---|---|
| 5,247,580 A | 9/1993 | Kimura et al. |
| 5,267,323 A | 11/1993 | Kimura |
| 5,477,262 A | 12/1995 | Banker et al. |
| 5,500,691 A | 3/1996 | Martin et al. |
| 5,500,794 A | 3/1996 | Fujita et al. |
| 5,534,913 A | 7/1996 | Majeti et al. |
| 5,566,271 A | 10/1996 | Tomitsuka et al. |
| 5,632,002 A | 5/1997 | Hashimoto et al. |
| 5,663,756 A | 9/1997 | Blahut et al. |
| 5,689,618 A | 11/1997 | Gasper et al. |
| 5,774,859 A | 6/1998 | Houser et al. |
| 5,790,173 A | 8/1998 | Strauss et al. |
| 5,832,439 A | 11/1998 | Cox, Jr. et al. |
| 5,889,506 A | 3/1999 | Lopresti et al. |
| 5,933,139 A | 8/1999 | Feigner et al. |
| 5,936,679 A | 8/1999 | Kasahara et al. |
| 5,983,190 A | 11/1999 | Trower, II et al. |
| 6,078,886 A | 6/2000 | Dragosh et al. |
| 6,101,473 A | 8/2000 | Scott et al. |
| 6,130,726 A | 10/2000 | Darbee et al. |
| 6,137,793 A | 10/2000 | Gorman et al. |
| 6,144,938 A | 11/2000 | Surace et al. |
| 6,151,490 A | 11/2000 | Schultheiss |
| 6,311,159 B1 | 10/2001 | Van Tichelen et al. |
| 6,314,398 B1 | 11/2001 | Junqua et al. |
| 6,314,573 B1 | 11/2001 | Gordon et al. |
| 6,320,947 B1 | 11/2001 | Joyce et al. |
| 6,324,512 B1 | 11/2001 | Junqua et al. |
| 6,327,566 B1 | 12/2001 | Vanbuskirk et al. |
| 6,345,389 B1 | 2/2002 | Dureau |
| 6,374,177 B1 | 4/2002 | Lee et al. |
| 6,381,316 B2 | 4/2002 | Joyce et al. |
| 6,397,186 B1 | 5/2002 | Bush et al. |
| 6,404,859 B1 | 6/2002 | Hasan |
| 6,408,272 B1 | 6/2002 | White et al. |
| 6,415,257 B1 | 7/2002 | Junqua et al. |
| 6,418,199 B1 | 7/2002 | Perrone |
| 6,453,290 B1 | 9/2002 | Jochumson |
| 6,459,910 B1 | 10/2002 | Houston |
| 6,480,703 B1 | 11/2002 | Calderone et al. |
| 6,480,819 B1 | 11/2002 | Bowman et al. |
| 6,490,727 B1 | 12/2002 | Nazarathy et al. |
| 6,513,063 B1 | 1/2003 | Julia et al. |
| 6,523,061 B1 | 2/2003 | Halverson et al. |
| 6,535,854 B2 | 3/2003 | Buchner et al. |
| 6,543,052 B1 | 4/2003 | Ogasawara |
| 6,546,002 B1 | 4/2003 | Kim |
| 6,553,345 B1 | 4/2003 | Kuhn et al. |
| 6,570,974 B1 | 5/2003 | Gerszberg et al. |
| 6,594,630 B1 | 7/2003 | Zlokarnik et al. |
| 6,606,280 B1 | 8/2003 | Knittel |
| 6,629,077 B1 | 9/2003 | Arling et al. |
| 6,643,620 B1 | 11/2003 | Contolini et al. |
| 6,650,624 B1 | 11/2003 | Quigley et al. |
| 6,658,414 B2 | 12/2003 | Bryan et al. |
| 6,711,543 B2 | 3/2004 | Cameron |
| 6,714,632 B2 | 3/2004 | Joyce et al. |
| 6,721,633 B2 | 4/2004 | Funk et al. |
| 6,725,022 B1 | 4/2004 | Clayton et al. |
| 6,725,303 B1 | 4/2004 | Hoguta et al. |
| 6,728,531 B1 | 4/2004 | Lee et al. |
| 6,742,021 B1 | 5/2004 | Halverson et al. |
| 6,757,363 B1 * | 6/2004 | Platt .................... H04M 1/253 379/88.11 |
| 6,757,365 B1 | 6/2004 | Bogard |
| 6,757,718 B1 | 6/2004 | Halverson et al. |
| 6,762,692 B1 | 7/2004 | Mingot et al. |
| 6,773,344 B1 | 8/2004 | Gabai et al. |
| 6,799,201 B1 | 9/2004 | Lee et al. |
| 6,801,896 B1 * | 10/2004 | Endo ...................... G10L 15/26 704/251 |
| 6,892,083 B2 | 5/2005 | Shostak |
| 6,925,651 B2 | 8/2005 | Foster et al. |
| 6,978,475 B1 | 12/2005 | Kunin et al. |
| 7,006,974 B2 | 2/2006 | Burchard et al. |
| 7,007,161 B2 | 2/2006 | Bradley |
| 7,013,283 B1 | 3/2006 | Murdock et al. |
| 7,027,987 B1 | 4/2006 | Franz et al. |
| 7,028,265 B2 * | 4/2006 | Kuromusha .......... G06F 3/0481 704/E15.045 |
| 7,039,074 B1 | 5/2006 | Calderone et al. |
| 7,047,196 B2 | 5/2006 | Calderone et al. |
| 7,054,819 B1 | 5/2006 | Loveland |
| 7,065,186 B1 | 6/2006 | Myers et al. |
| 7,096,185 B2 | 8/2006 | Reichardt et al. |
| 7,113,981 B2 | 9/2006 | Slate |
| 7,222,073 B2 | 5/2007 | Julia et al. |
| 7,260,538 B2 | 8/2007 | Calderone et al. |
| 7,284,202 B1 | 10/2007 | Zenith |
| 7,292,986 B1 * | 11/2007 | Venolia .................. G06F 3/167 704/270 |
| 7,324,947 B2 | 1/2008 | Jordan et al. |

(56) References Cited

U.S. PATENT DOCUMENTS

| | | |
|---|---|---|
| 7,447,635 B1 | 11/2008 | Konopka et al. |
| 8,005,679 B2 | 8/2011 | Jordan et al. |
| 8,095,370 B2 | 1/2012 | Foster |
| 8,271,287 B1* | 9/2012 | Kermani .......... H04N 21/42203 704/275 |
| 8,374,875 B2 | 2/2013 | Genly |
| 2001/0012335 A1 | 8/2001 | Kaufman et al. |
| 2001/0019604 A1 | 9/2001 | Joyce et al. |
| 2001/0043230 A1 | 11/2001 | Furusawa et al. |
| 2001/0054183 A1 | 12/2001 | Curreri |
| 2001/0056350 A1 | 12/2001 | Calderone et al. |
| 2002/0010589 A1 | 1/2002 | Nashida et al. |
| 2002/0013710 A1 | 1/2002 | Shimakawa |
| 2002/0015480 A1 | 2/2002 | Daswani et al. |
| 2002/0035477 A1 | 3/2002 | Schroder et al. |
| 2002/0044226 A1* | 4/2002 | Risi .................... H04N 5/44582 348/734 |
| 2002/0049535 A1 | 4/2002 | Rigo et al. |
| 2002/0052746 A1 | 5/2002 | Handelman |
| 2002/0054206 A1 | 5/2002 | Allen |
| 2002/0055844 A1 | 5/2002 | L'Esperance et al. |
| 2002/0069063 A1 | 6/2002 | Buchner et al. |
| 2002/0071577 A1 | 6/2002 | Lemay et al. |
| 2002/0072912 A1 | 6/2002 | Yen et al. |
| 2002/0078463 A1 | 6/2002 | Foster |
| 2002/0095294 A1 | 7/2002 | Korfin et al. |
| 2002/0106065 A1 | 8/2002 | Joyce et al. |
| 2002/0107695 A1* | 8/2002 | Roth ...................... G10L 15/22 704/275 |
| 2002/0124255 A1 | 9/2002 | Reichardt et al. |
| 2002/0133828 A1 | 9/2002 | Foster |
| 2002/0146015 A1 | 10/2002 | Bryan et al. |
| 2003/0005431 A1 | 1/2003 | Shinohara |
| 2003/0018479 A1 | 1/2003 | Oh et al. |
| 2003/0028380 A1 | 2/2003 | Freeland et al. |
| 2003/0033152 A1 | 2/2003 | Cameron |
| 2003/0046071 A1* | 3/2003 | Wyman .................. G10L 15/22 704/235 |
| 2003/0056228 A1 | 3/2003 | Foster et al. |
| 2003/0065427 A1 | 4/2003 | Funk et al. |
| 2003/0068154 A1 | 4/2003 | Zylka |
| 2003/0073434 A1 | 4/2003 | Shostak |
| 2003/0088399 A1 | 5/2003 | Kusumoto |
| 2003/0105637 A1 | 6/2003 | Rodriguez et al. |
| 2003/0122652 A1 | 7/2003 | Himmelstein |
| 2003/0212845 A1 | 11/2003 | Court et al. |
| 2004/0077334 A1 | 4/2004 | Joyce et al. |
| 2004/0110472 A1 | 6/2004 | Witkowski et al. |
| 2004/0127241 A1 | 7/2004 | Shostak |
| 2004/0132433 A1 | 7/2004 | Stern et al. |
| 2004/0244056 A1 | 12/2004 | Lorenz et al. |
| 2005/0143139 A1 | 6/2005 | Park et al. |
| 2005/0144251 A1 | 6/2005 | Slate |
| 2005/0170863 A1 | 8/2005 | Shostak |
| 2005/0172319 A1 | 8/2005 | Reichardt et al. |
| 2006/0018440 A1 | 1/2006 | Watkins et al. |
| 2006/0050686 A1 | 3/2006 | Velez-Rivera et al. |
| 2006/0085521 A1 | 4/2006 | Sztybel |
| 2006/0206339 A1 | 9/2006 | Silvera et al. |
| 2006/0206340 A1 | 9/2006 | Silvera et al. |
| 2007/0174057 A1 | 7/2007 | Genly |

FOREIGN PATENT DOCUMENTS

| | | |
|---|---|---|
| EP | 1 003 018 B1 | 5/2000 |
| EP | 1 341 363 A1 | 9/2003 |
| EP | 1 633 150 A2 | 3/2006 |
| EP | 1 633 151 A2 | 3/2006 |
| EP | 1 742 437 A1 | 1/2007 |
| FR | 2612322 A1 | 9/1988 |
| JP | S6016720 A | 1/1985 |
| JP | H04351094 A | 12/1992 |
| WO | 1994013107 A1 | 6/1994 |
| WO | 1995006309 A1 | 3/1995 |
| WO | 99050826 A1 | 10/1999 |
| WO | 2000004706 A2 | 1/2000 |
| WO | 200016568 | 3/2000 |
| WO | 2000011869 A1 | 3/2000 |
| WO | 2000021232 | 4/2000 |
| WO | 2001022112 | 3/2001 |
| WO | 2001022249 | 3/2001 |
| WO | 2001022633 | 3/2001 |
| WO | 2001022712 | 3/2001 |
| WO | 2001022713 | 3/2001 |
| WO | 2001039178 | 5/2001 |
| WO | 2001057851 | 8/2001 |
| WO | 2001084539 A1 | 11/2001 |
| WO | 2002007050 | 1/2002 |
| WO | 2002011120 | 2/2002 |
| WO | 2002017090 | 2/2002 |
| WO | 2002097590 | 12/2002 |
| WO | 2004021149 | 3/2004 |
| WO | 2004077721 | 9/2004 |
| WO | 2005079254 | 9/2005 |
| WO | 2006029269 | 3/2006 |
| WO | 2006033841 | 3/2006 |
| WO | 2006098789 | 9/2006 |

OTHER PUBLICATIONS

Allan et al., "Implementation of a terrestrial return channel for digital interactive video broadcast", International Broadcasting Convention, Sep. 12-16, 1997, Amsterdam, the Netherlands.

O'Malley, "Voice recognition gets real", Popular Science, May 1993, pp. 74-77 and 111, Rushcutters Bay, Australia.

Muthusamy et al., "Speech-enabled information retrieval in the automobile environment", 1999 IEEE International Conference on Acoustics, Speech, and Signal Processing, Mar. 15-19, 1999, Phoenix, Arizona, U.S.A.

Scalise, "A New Solution for Wireless Interactive TV Based on DVB-T Standard and SFDMA Technique", 9th Conference and Exhibition of the SMPTE (Society of Motion Picture and Television Engineers), Australia Section, Jul. 13-16, 1999, Sydney, Australia.

Vittore V., "Just say the magic word: Oprah. (voice recognition technology)", Telephone Engineer & Management, vol. 99, No. 1, Jan. 1, 1995, Advanstar Communications, Inc., Santa Ana, California, U.S.A., 3 pages.

Portolan N. et al., "Will we speak to our TV remote control in the future?", CNET Rennes, CCETT, 35512, Cesson Sevigne, France, Proceedings of the HFT '99 Conference, 8 pages, 1999.

Usagawa, T. et al. "A configuration of remote control system using speech within a priori known noise", J. Acoust. Soc. Jpn. (E) 13, 5, 1992, Japan, 6 pages.

"DCT 2000 Digital Consumer Terminal Installation Manual", Copyright 2000 by General Instrument Corporation, Horsham, Pennsylvania, U.S.A., 70 pages.

"Nuance 7.0," EE Times, first posted Aug. 5, 2000, Copyright 2017 by UBM Electronics, U.S.A., 1 page.

"Osprey to fly at COMDEX; Speech recognition-based phone assistant ready for partners," Business Wire, Nov. 6, 1995, U.S.A., 3 pages.

Adams, M., "Pegasus Network Architecture", 1997 National Cable Television Association (NCTA '97) Technical Papers, pp. 40-48, 1997, Washington, D.C., U.S.A., 9 pages.

Brown, R., "Pegasus Set-top Terminal", 1997 National Cable Television Association (NCTA '97) Technical Papers, pp. 24-31, Washington, D.C., U.S.A., 8 pages.

Ciciora, W., et al., excerpts from "Modern Cable Television Technology—Video, Voice, and Data Communications", 1999, pp. 36-38, Morgan Kaufman Publishers, San Francisco, California, U.S.A., 10 pages.

Digalakis, V. et al., "Quantization of Cepstral Parameters for Speech Recognition over the World Wide Web", IEEE Journal on Selected Areas in Communications, vol. 17, No. 1, U.S.A., Jan. 1999, 9 pages.

Henriques, D, "Technology: Market Place; Dragon Systems, a Former Little Guy, Gets Ready for Market"; New York Times, Mar. 1, 1999, New York, NY, U.S,A,, 5 pages.

(56) References Cited

OTHER PUBLICATIONS

IBM: "Speech Recognition Methods for Controlling Cable Television," IBM Technical Disclosure Bulletin, vol. 38, No. 08, Aug. 1995, U.S.A., 3 pages.
Kuhl, C., "Serving up a new business", CED Magazine, May 1999, Rockaway, New Jersey, U.S.A., 4 pages.
Moran, D. et al., "Multimodal User Interfaces in the Open Agent Architecture", Proceedings of the 2nd International Conference on Intelligent User Interfaces (IUI '97), pp. 61-68, 1997, Orlando, Florida, U.S.A., 8 pages.
Pearce, D., "Enabling New Speech Driven Services for Mobil e Devices: An overview of the ETSI standards activities for Distributed Speech Recognition Front-ends", AVIOS 2000: The Speech Applications Conference, May 22-24, 2000, San Jose, California, U.S.A., 12 pages.
Quain, J., "Listen for Windows Lets Your PC Understand What You Say", PC Magazine, Jun. 15, 1993, U.S.A., 2 pages.
Reddy, D., "Speech Recognition by Machine: A Review", Proceedings of the IEEE, vol. 64, No. 4, Apr. 1976, U.S.A., 31 pages.
Scannell, E., "IBM dictation software package gives computers a voice" , InfoWorld magazine, Jun. 16, 1997, U.S.A., 2 pages.
Murdock et al., U.S. Appl. No. 60/166,010, filed Nov. 17, 1999, entitled "System and Method for Voice Navigation for Networked Television-Centric Information Services With Back Channel", 10 pages.

* cited by examiner

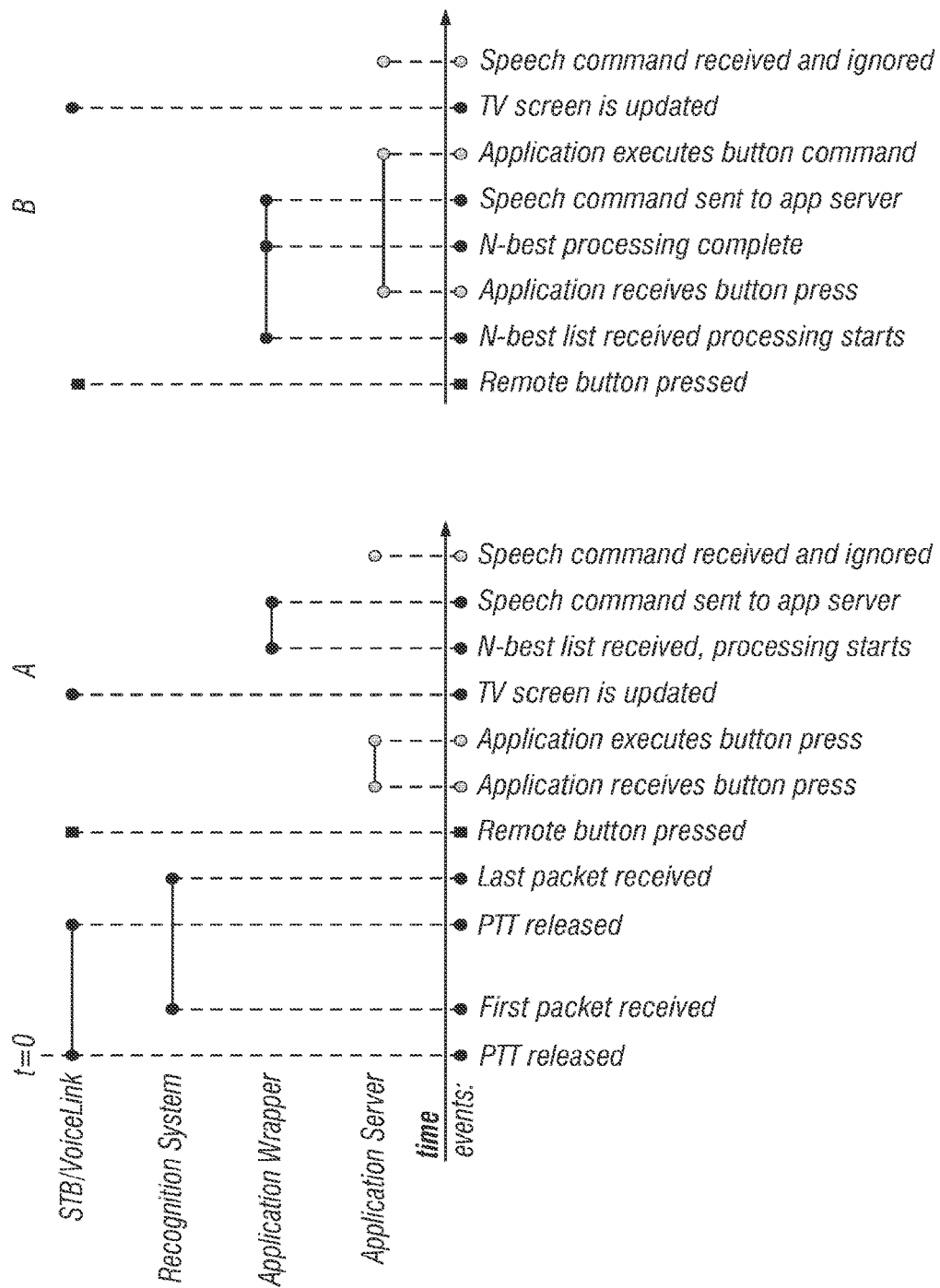

GLOBAL SPEECH USER INTERFACE

CROSS-REFERENCE TO RELATED APPLICATIONS

This application is a continuation of U.S. patent application Ser. No. 14/572,596, filed Dec. 16, 2014, which is a continuation of U.S. patent application Ser. No. 14/029,729, filed Sep. 17, 2013, now U.S. Pat. No. 8,983,838, issued Mar. 17, 2015, which is a divisional of U.S. patent application Ser. No. 13/786,998, filed Mar. 6, 2013, now U.S. Pat. No. 8,818,804, issued Aug. 26, 2014, which is a divisional of U.S. patent application Ser. No. 13/179,294, filed Jul. 8, 2011, now U.S. Pat. No. 8,407,056, issued Mar. 26, 2013, which is a continuation of U.S. patent application Ser. No. 11/933,191, filed Oct. 31, 2007, now U.S. Pat. No. 8,005,679, issued Aug. 23, 2011, which is a divisional application of U.S. patent application Ser. No. 10/260,906, filed Sep. 30, 2002, now U.S. Pat. No. 7,324,947, issued Jan. 29, 2008, which application claims priority to U.S. provisional patent application Ser. No. 60/327,207, filed Oct. 3, 2001, each of which is incorporated herein in its entirety by this reference thereto.

FIELD OF THE INVENTION

This invention relates generally to interactive communications technology, and more particularly to a speech-activated user interface used in a communications system for cable television or other services.

BACKGROUND OF THE INVENTION

Speech recognition systems have been in development for more than a quarter of century, resulting in a variety of hardware and software tools for personal computers. Products and services employing speech recognition are rapidly being developed and are continuously applied to new markets.

With the sophistication of speech recognition technologies, networking technologies, and telecommunication technologies, a multifunctional speech-activated communications system, which incorporates TV program service, video on demand (VOD) service, and Internet service and so on, becomes possible. This trend of integration, however, creates new technical challenges, one of which is the provision of a speech-activated user interface for managing the access to different services. For example, a simple and easy to use speech-activated user interface is essential to implement a cable service system that is more user-friendly and more interactive.

In a video on demand (VOD) system, cable subscribers pay a fee for each program that they want to watch, and they may have access to the video for several days. While they have such access, they can start the video any time, watch it as many times as they like, and use VCR-like controls to fast forward and rewind. One of the problems with button-enabled video on demand systems is that navigation is awkward. Cable subscribers frequently need to press the page up/down buttons repeatedly until they find the movie they want. It is impractical in speech enabled systems because there are limits to the number of items that the speech recognition system can handle at once. What is desired is a powerful interface that gives users more navigation options without degrading recognition accuracy. For example, the interface might enable the users, when viewing a movie list, to say a movie name within that list and be linked to the movie information screen.

The interactive program guide (IPG) is the application that cable subscribers use to find out what's on television. One of the problems with button-enabled program guides is that navigation is awkward. Cable subscribers frequently need to press the page up/down buttons repeatedly until they find the program they want. What is further desired is a streamlined interface where many common functions can be performed with fewer voice commands. For example, the interface allows the use of spoken commands to control all IPG functionality.

Another problem is that the user must switch to the program guide to find out what's on and then switch back to watch the program. There are some shortcuts, but finding programs and then switching to them still requires many button presses. What is further desired is an application that allows cable subscribers to get one-step access to programs they want to watch without ever switching away from the current screen.

Another important issue in the design of a speech-activated user interface is responsiveness. To interact with the communications system effectively, the user is required to give acceptable commands, and the communications system is required to provide instant feedback. A regular user, however, may not be able to remember the spoken commands used in the speech interface system. What is further desired is an efficient mechanism to provide immediate and consistent visual feedback messages consisting of frequently used commands, speakable text, and access to the main menu, as well as offering escalating levels of help in the event of unsuccessful speech recognition.

SUMMARY OF THE INVENTION

This invention provides a global speech user interface (GSUI) which supports the use of speech as a mechanism of controlling digital TV and other content. The functionality and visual design of the GSUI is consistent across all speech-activated applications and services. The visual design may include the use of an agent as an assistant to introduce concepts and guide the user through the functionality of the system. Specific content in the GSUI may be context-sensitive and customized to the particular application or service.

The presently preferred embodiment of the GSUI consists of the following elements: (1) an input system, which includes a microphone incorporated in a standard remote control with a push-to-talk button, for receiving the user's spoken command (i.e. speech command); (2) a speech recognition system for transcribing a spoken command into one or more commands acceptable by the communications system; (3) a navigation system for navigating among applications run on said communications system; and (4) a set of overlays on the screen to help the users understand the system and to provide user feedback in response to inputs; and (5) a user center application providing additional help, training and tutorials, settings, preferences, and speaker training The overlays are classified into four categories: (1) a set of immediate speech feedback overlays; (2) a help overlay or overlays that provide a context-sensitive list of frequently used speech-activated commands for each screen of every speech-activated application; (3) a set of feedback overlays that provides information about a problem that said communications system is experiencing; and (4) a main menu overlay that shows a list of services available to the user, each of said services being accessible by spoken command.

An immediate speech feedback overlay is a small tab, which provides simple, non-textual, and quickly understood feedback to the user about the basic operation of the GSUI. It shows the user when the communications system is listening to or processing an utterance, whether or not the application is speech enabled, and whether or not the utterance has been understood.

The last three categories of overlays are dialog boxes, each of which may contain a tab indicating a specific state of the speech recognition system, one or more text boxes to convey service information, and one or more virtual buttons that can be selected either by spoken command or pressing the actual corresponding buttons of the remote control device.

The help overlay provides a list of context-sensitive spoken commands for the current speech-activated application and is accessible at all times. It also provides brief instructions about what onscreen text is speakable and links to more help in the user center and the main menu. Here, the term "speakable" is synonymous with "speech-activated" and "speech-enabled."

Feedback overlays include recognition feedback overlays and application feedback overlays. Recognition feedback overlays inform the user that there has been a problem with recognition. The type of feedback that is given to the user includes generic "I don't understand" messages, lists of possible recognition matches, and more detailed help for improving recognition. Application feedback overlays inform the user about errors or problems with the application that are not related to unsuccessful recognition.

The main menu overlay provides the list of digital cable services that are available to the user. The main menu overlay is meant to be faster and less intrusive than switching to the multiple system operator's full-screen list of services.

One deployment of the GSUI is for the Interactive Program Guide (IPG), which is the application that the cable subscribers use to find out what's on television. The GSUI provides a streamlined interface where many common functions can be performed more easily by voice. The GSUI for the IPG allows the use of spoken commands to control all IPG functionality. This includes: (1) selecting on-screen "buttons"; (2) directly accessing any program or channel in the current time slot; and (3) performing every function that can be executed with remote control key presses.

Another deployment of the GSUI is for the Video on Demand (VOD), which functions as an electronic version of a video store. The GSUI provides a streamlined interface where many common functions can be performed more easily by voice. The GSUI for the VOD allows the use of spoken commands to control all VOD functionality. This includes: (1) selecting on-screen "buttons"; (2) directly accessing any movie title in a particular list; and (3) performing every function that can be executed with remote control key presses.

Another deployment of the GSUI is for a user center, which is an application that provides: (1) training and tutorials on how to use the system; (2) more help with specific speech-activated applications; (3) user account management; and (4) user settings and preferences for the system.

Another aspect of the invention is the incorporation of a Speaker ID function in the GSUI. Speaker ID is a technology that allows the speech recognition system to identify a particular user from his spoken utterances. For the system to identify the user, the user must briefly train the system, with perhaps 45 seconds of speech. When the system is fully trained, it can identify that particular speaker out of many other speakers. In the present embodiment, Speaker ID improves recognition accuracy. In other embodiments, Speaker ID allows the cable service to show a custom interface and personalized television content for a particular trained speaker. Speaker ID can also allow simple and immediate parental control. Thus, e.g. an utterance itself, rather than a PIN, can be used to verify access to blocked content.

The advantages of the GSUI disclosed herein are numerous, for example: first, it provides feedback about the operation of the speech input and recognition systems; second, it shows the frequently used commands on screen and a user does not need to memorize the commands; third, it provides consistent visual reference to speech-activated text; and fourth, it provides help information in a manner that is unobstructive to screen viewing.

BRIEF DESCRIPTION OF THE DRAWINGS

FIG. 3C is a sequence diagram showing the time line when the spoken command is interrupted by a button input (case 2);

DETAILED DESCRIPTION

A Communications System Providing Digital Cable Service

Figure 1:
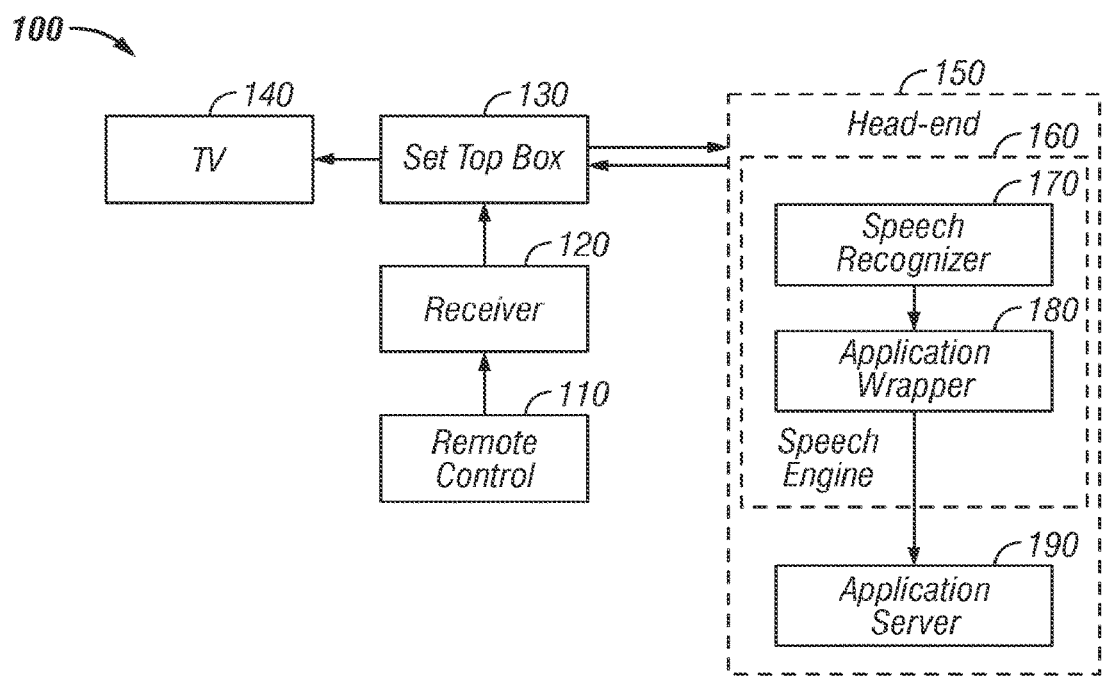
FIG. 1 is block diagram illustrating an exemplary communications system providing digital cable services according to the invention.

Illustrated in FIG. 1 is an exemplary communications system 100 for facilitating an interactive digital cable service into which a global speech user interface (GSUI) is embedded. The user interacts with the communications system by giving spoken commands via a remote control device 110, which combines universal remote control functionality with a microphone and a push-to-talk button acting as a switch. The remote control device in the presently preferred embodiment of the invention is fully compatible with the Motorola DCT-2000 (all of the standard DCT-2000 remote buttons are present). The spoken commands are transmitted from the remote control device 110 to the receiver 120 when the cable subscriber presses the push-to-talk button and speaks into the microphone. The receiver 120 receives and sends the received speech input to a set-top-box (STB) 130.

The STB 130 forwards the speech input to the head-end 150, which is the central control center for a cable TV system. The head-end 150 includes a speech engine 160, which comprises a speech recognizer 170, and an application wrapper 180. The speech recognizer 170 attempts to transcribe the received speech input into textual information represented by binary streams. The output of the speech recognizer 170 is processed by the application wrapper 180, which dynamically generates a set of navigation grammars and a vocabulary, and attempts to determine whether a speech input has been recognized or not. Here, a navigation grammar means a structured collection of words and phrases bound together by rules that define the set of all utterances that can be recognized by the speech engine at a given point in time.

When the speech input is recognized, the application wrapper 180 transforms the speech input into commands acceptable by the application server 190, which then carries out the user's requests. The application server 190 may or may not reside on the speech engine 160. During the process, the communications system 100 returns a set of feedback information to the TV screen via STB 130. The feedback information is organized into an overlay on the screen.

Television Screen Interface—Functionality and Flows

The television screen interface elements of the Global Speech User Interface (GSUI) include (1) immediate speech feedback overlays; (2) instructive speech feedback overlays; (3) help overlays; (4) main menu overlays; and (5) speakable text indicators.

Immediate Speech Feedback

Figure 2A:
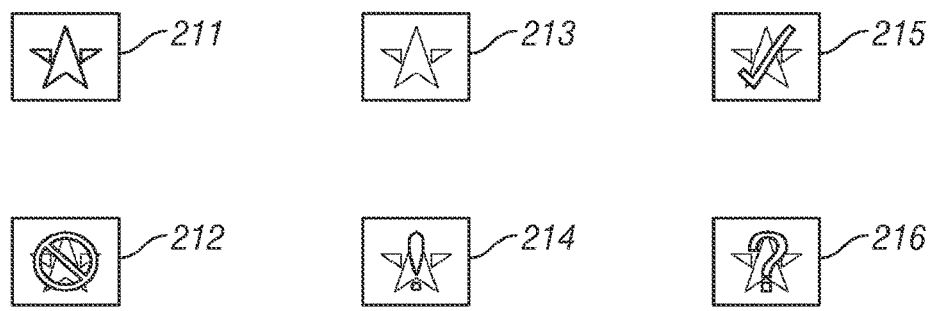
FIG. 2A shows six basic tabs used to indicate immediate feedback information.

Immediate speech feedback provides real-time, simple, graphic, and quickly understood feedback to the cable subscriber about the basic operation of the GSUI. This subtle, non-textual feedback gives necessary information without being distracting. FIG. 2A illustrates various exemplary tabs used to indicate such feedback information. In the preferred embodiment, the immediate speech feedback displays the following six basic states (Those skilled in the art will appreciate that the invention comprehends other states or representations as well):

(1) The push-to-talk button pressed down—the system has detected that the button on the remote has been pressed and is listening to the cable subscriber. On the screen, a small tab 211 is displayed that includes, for example, a highlighted or solid identity indicator or brand logo.

(2) The application or screen is not speech enabled. When the user presses the push-to-talk button, a small tab 212 is displayed that includes a prohibition sign (⊘) overlaid on a non-highlighted brand logo.

(3) The system is processing an utterance, i.e. covering the duration between the release of the push-to-talk button and the resulting action of the communications system. On the screen, a small tab 213 is displayed that includes a transparency or semi transparency (40% transparency for example) flashing brand logo. The tab 213 is alternated with an empty tab to achieve the flashing effect.

(4) Application is alerted. On the screen, a small tab 214 is displayed that includes a yellow exclamation point overlaid on a non-highlighted brand logo. It may have different variants. For example, it may come with a short dialog message (variant 214A) or a long dialog message (variant 214B).

(5) Successful recognition has occurred and the system is executing an action. On the screen, a small tab 215 is displayed that includes a green check mark overlaid on a non-highlighted brand logo.

(6) Unsuccessful recognition has occurred. After the first try, the recognition feedback overlay is also displayed. On the screen, a small tab 216 is displayed that includes a red question mark overlaid on a non-highlighted brand logo.

These states are shown in the following set of four flowcharts (FIG. 2B through FIG. 2E). Note that in the preferred embodiment, the conventional remote control buttons are disabled while the push-to-talk button is pressed, and that once the system has started processing a spoken command, the push-to-talk button is disabled until the cable subscriber receives notification that the recognition was successful, unsuccessful, or stopped.

FIGS. 2B, 2C, 2D and 2E are flow diagrams illustrating an exemplary process 200 that the communications system displays immediate feedback overlays on the screen.

Figure 2B:
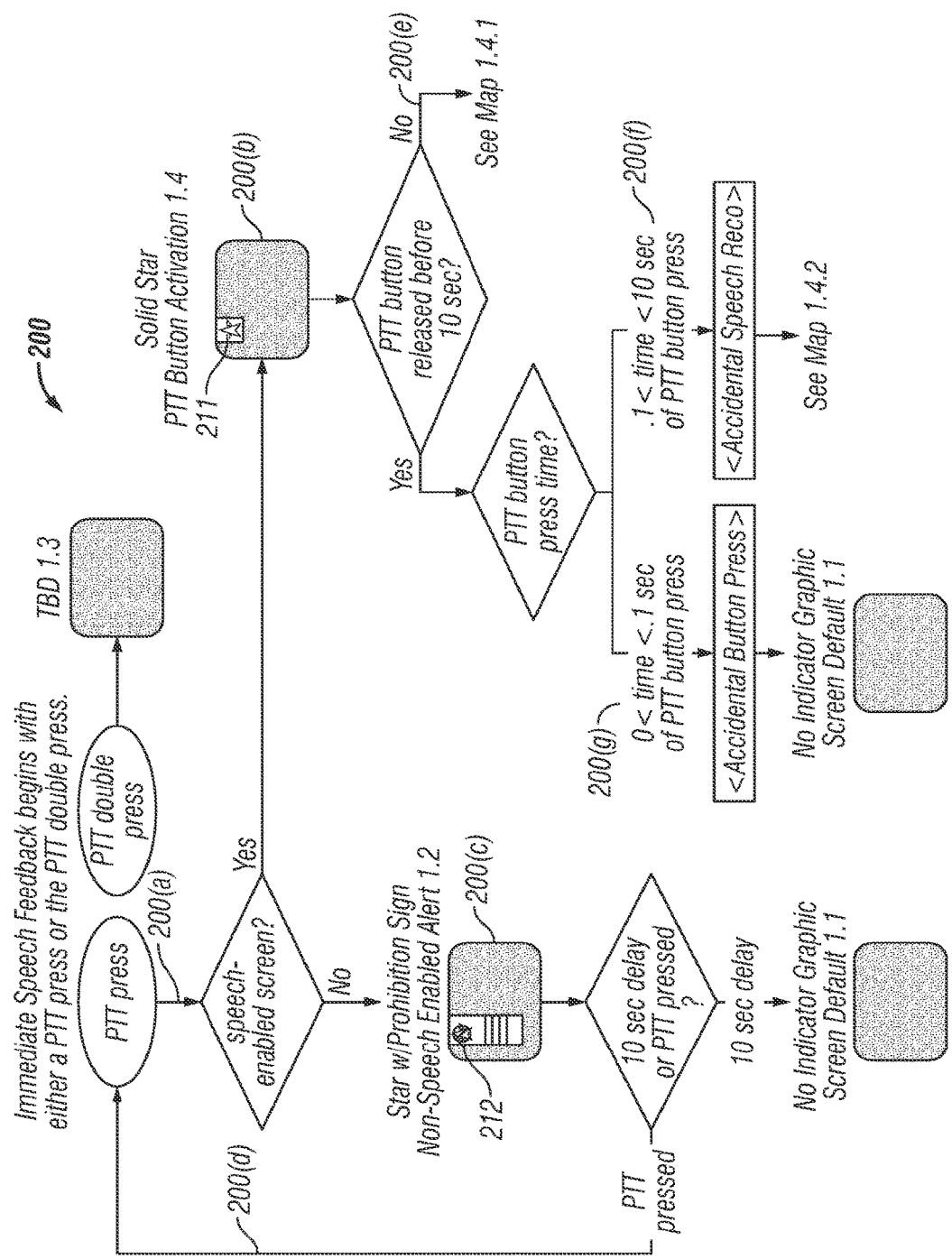
FIGS. 2B, 2C, 2D, and 2E are flow diagrams illustrating an exemplary process by which the communications system displays immediate feedback overlays on the screen.

FIG. 2B illustrates the steps 200(*a*)-200(*g*) of the process:

200(*a*): Checking if a current screen is speech-enabled when the press-to-talk button is pressed.

200(*b*): If the current screen is speech-enabled, displaying a first tab 211 signaling that a speech input system is activated. This first tab 211 includes a highlighted or solid brand logo.

200(*c*): If the current screen is not speech-enabled, displaying a second tab 212 signaling a non-speech-enabled alert. This second tab 212 includes a prohibition sign (⊘) overlaid on a non-highlighted brand logo. It stays on screen for an interval about, for example, ten seconds.

200(*d*): If the push-to-talk button is repressed before or after the second tab 212 disappears, repeating 200(*a*).

Step 200(*b*) is followed by the steps 200(*e*), 200(*f*), and 200(*g*).

200(*e*): If the push-to-talk button is not released within a second interval (about 10 seconds, for example), interrupting recognition.

200(*f*): If the push-to-talk button is released after a third interval (about 0.1 second, for example) lapsed but before the second interval in Step 200(*e*) lapsed, displaying a third tab 213 signaling that speech recognition is in processing. This third tab includes a transparency or semi transparency flashing brand logo.

200(*g*): If the push-to-talk button was released before the third interval lapsed, removing any tab on the screen.

Note that FIG. 2B includes a double press of the talk button. The action to be taken may be designed according to need. A double press has occurred when there is 400 ms or less between the "key-up" of a primary press and the "key down" of a secondary press.

Figure 2C:
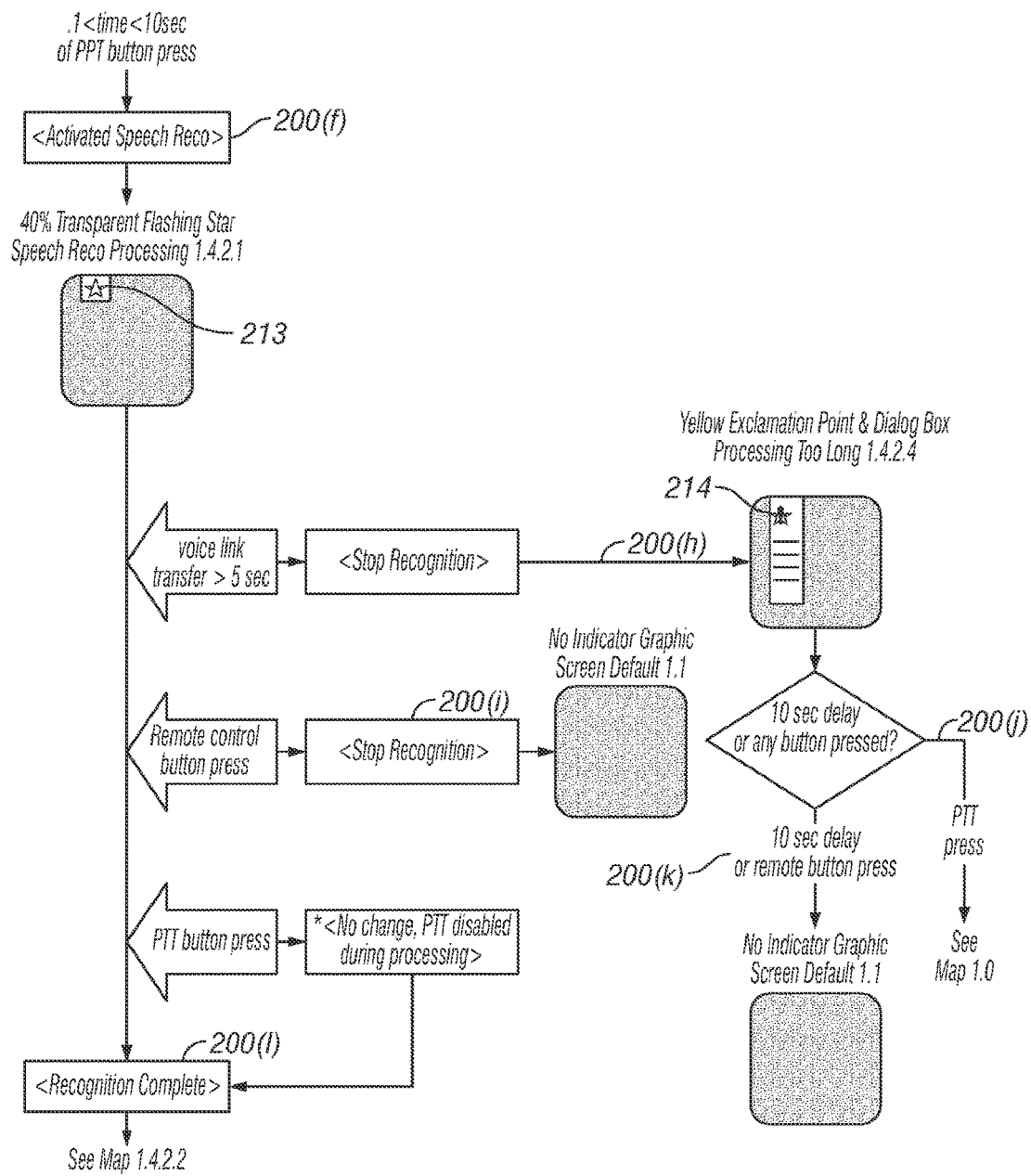

FIG. 2C illustrates the steps 200(*f*)-200(*k*) of the process. Note that when there is no system congestion, there should rarely be a need for the cable subscriber to press a remote control button while a spoken command is being processed. When there is system congestion, however, the cable subscriber should be able to use the remote control buttons to improve response time. An extensive discussion of when cable subscribers can issue a second command while the first is still in progress and what happens when they do so is given after the description of this process.

Steps 200(*f*) is followed by the steps 200(*h*) and 200(*i*):

200(*h*): If the Set Top Box 130 in FIG. 1 takes longer than a fourth interval (five seconds, for example) measured from the time that the cable subscriber releases the push-to-talk button to the time the last speech data is sent to the head-end 150, speech recognition processing is interrupted and a fourth tab 214V (which is a variant of the tab 214), signaling an application alert. The fourth tab 214V includes a yellow exclamation point with a short dialog message such as a "processing too long" message. It stays on the screen for a fifth interval (about 10 seconds, for example).

200(*i*): If a remote control button other than the push-to-talk button is pressed while a spoken command is being processed, interrupting speech recognition processing and removing any tab on the screen.

Step 200(*h*) may be further followed by the steps 200(*j*) and 200(*k*):

200(*j*): If the push-to-talk button is repressed while the fourth tab 214V is on the screen, removing the fourth tab and repeating 200(*a*). This step illustrates a specific situation where the recognition processing takes too long. Note that it does not happen every time the fourth tab is on the screen.

200(*k*): When said fifth interval lapses or if a remote control button other than the push-to-talk button is pressed while said fourth tab 214V is on the screen, removing said fourth tab from the screen.

Figure 2D:
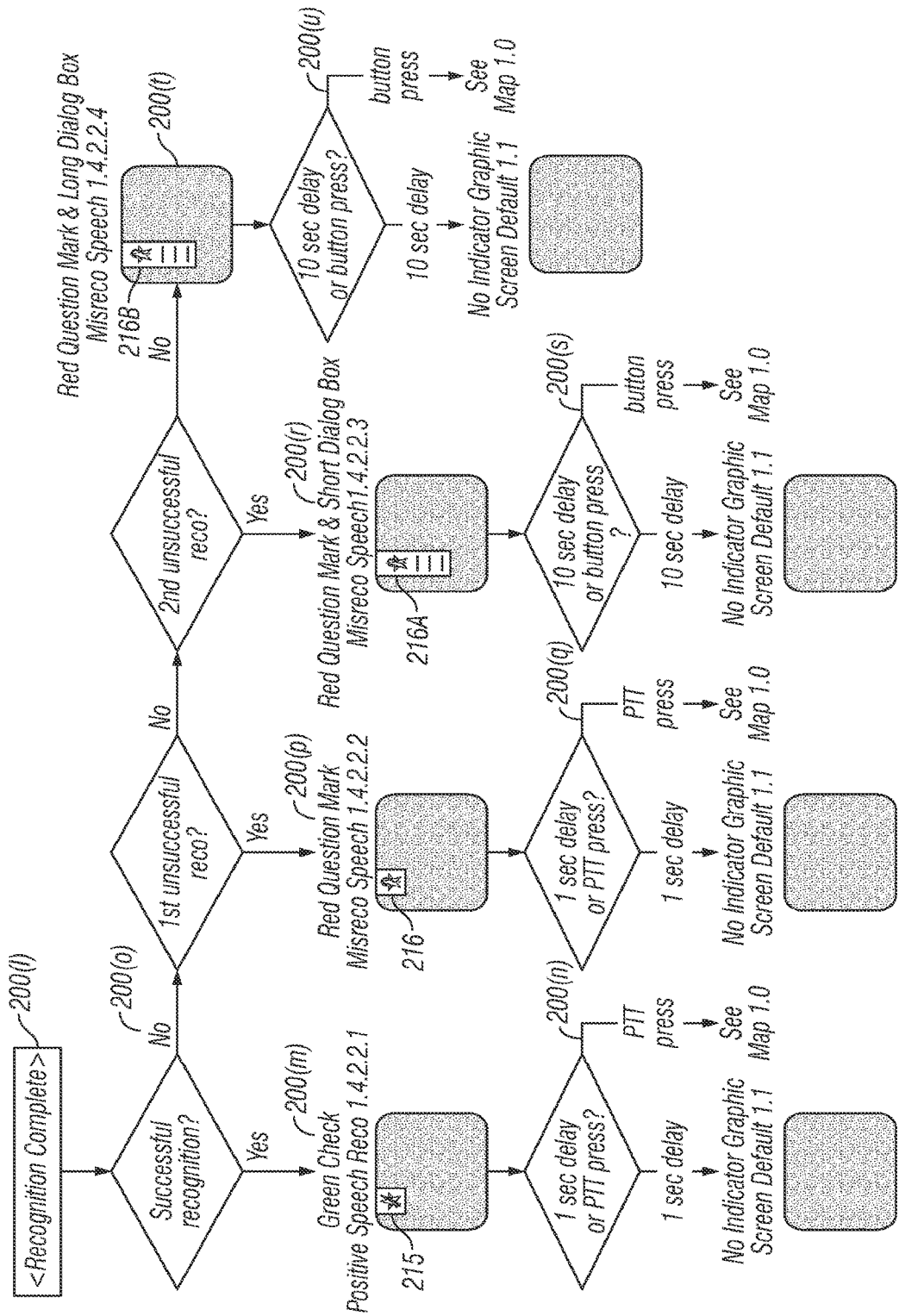

FIG. 2D illustrates the steps 200(*l*)-200(*u*) upon a complete recognition of 200(*f*). Note that the system keeps track of the number of unsuccessful recognitions in a row. This number is reset to zero after a successful recognition and when the cable subscriber presses any remote control button. If this number is not reset, the cable subscriber continues to see the long recognition feedback message any time there is an unsuccessful recognition. If cable subscribers are having difficulty with the system, the long message is good, even when several hours have elapsed between unsuccessful recognitions. The recognition feedback only stays on screen for perhaps one second, so it is not necessary to remove it when any of the remote control buttons is pressed. When the push-to-talk button is repressed, the recognition feedback should be replaced by the speech activation tab 211.

200(*l*): Checking whether speech recognition is successful.

200(*m*): If speech recognition is successful, displaying a fifth tab 215 signaling a positive speech recognition. The fifth tab includes a green check mark overlaid on a non-highlighted brand logo. It stays on the screen for an interval about, for example, one second.

200(*n*): If the push-to-talk button is repressed before the fifth tab 215 disappears, repeating 200(*a*).

200(*l*) is followed by the steps 200(*o*), 200(*q*), and 200(*r*).

200(*o*): If the speech recognition is unsuccessful, checking the number of unsuccessful recognitions. The number is automatically tracked by the communications system and is reset to zero upon each successful recognition or when any button of the remote control device is pressed.

200(*p*): If the complete recognition is the first unsuccessful recognition, displaying a sixth tab 216 signaling a misrecognition of speech. This sixth tab 216 includes a red question mark overlaid on said brand logo. It stays on the screen for about, for example, one second.

200(*q*): If the push-to-talk button is repressed before the sixth tab disappears 216, repeating 200(*a*).

Step 200(*o*) is followed by the steps 200(*r*) and 200(*s*):

200(*r*): If the complete recognition is the second unsuccessful recognition, displaying a first variant 216A of the sixth tab signaling a misrecognition speech and displaying a short textual message. This first variant 216A of the sixth tab comprises a red question mark overlaid on said brand logo and a short dialog box displaying a short textual message. The first variant 216A stays on the screen for about, for example, ten seconds.

200(*s*): If the push-to-talk button is repressed before the first variant 216A of the sixth tab disappears, repeating 200(*a*).

Step 200(*o*) is followed by the steps 200(*t*) and 200(*u*):

200(*t*): If it is the third unsuccessful recognition, displaying a second variant 216B of the sixth tab signaling a misrecognition speech and displaying a long textual message. The second variant of the sixth tab stays on the screen for an interval about, for example, ten seconds.

200(*u*): If the push-to-talk button is pressed before the second variant 216B of the sixth tab disappears, repeating 200(*a*).

Figure 2E:
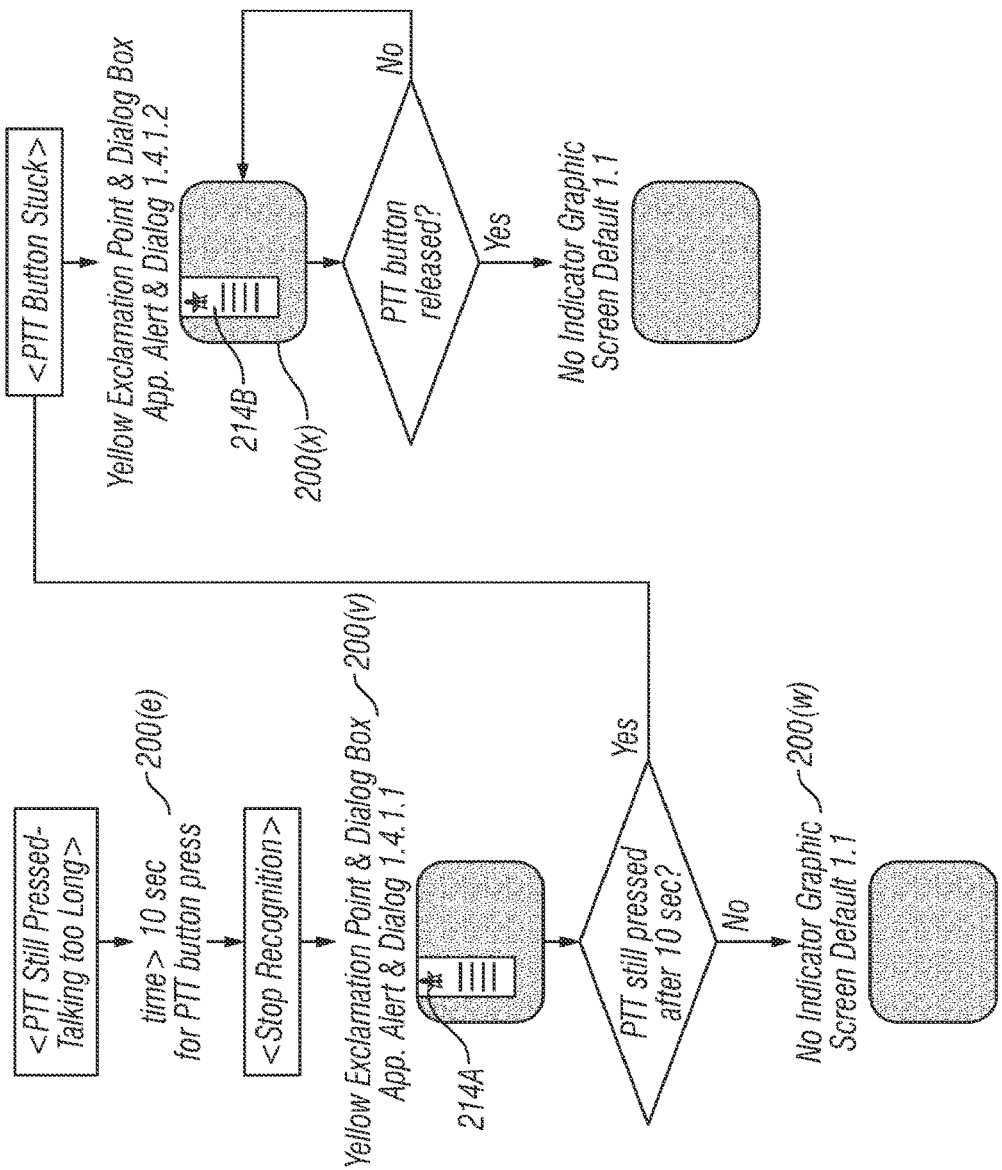

FIG. 2E illustrates the steps 200(*v*)-200(*x*) following the Step 200(*e*). Note that in the preferred embodiment, there are two different messages when the talk button is held down for a long interval. The first message covers the relatively normal case where the cable subscriber takes more than ten seconds to speak the command. The second covers the abnormal case where the push-to-talk button is stuck. There is no transition between the two messages. The second message stays on screen until the button is released.

200(*e*): If the push-to-talk button is not released within a second interval (about ten seconds, for example), interrupting recognition.

200(*v*): Displaying a first variant 214A of the fourth tab. The first variant 214A includes a yellow exclamation point and a first textual message. This tab stays on the screen for an interval of about, for example, ten seconds.

200(*w*): Removing the first variant 214A of the fourth tab from the screen if the push-to-talk button is released after the interval lapsed.

200(*x*): Displaying a second variant 214B of the fourth tab. The second variant 214B includes a yellow exclamation point and a second textual message. This tab is not removed unless the push-to-talk button is released.

Command Sequencing

Described below are various issues concerning command sequencing. These issues arise from the latency between a command and its execution. Spoken commands introduce longer latencies because speech requires more bandwidth to the head-end, and it can be affected by network congestion. In addition, some applications are implemented by an agent. In these cases, recognition is performed on the engine of the communications system and the command is then sent on to the agent's application server. Applications on the engine and those on the agent's server should look the same to cable subscribers. In particular, it is highly desirable for the recognition feedback for a spoken command and the results of the execution to appear on the television screen at the same time. However, if there is likely to be latency in communicating with an off-engine application server or in the execution of the command, the recognition feedback should appear as soon as it is available.

When there is congestion and spoken commands are taking a long time to process, the cable subscriber may try to use the buttons on the remote control or to issue another spoken command. The sequence diagrams below describe what happens when the cable subscriber attempts to issue another command. There are race conditions in the underlying system. The guidelines to handle these sequencing issues support two general goals:

First, the cable subscriber should be in control. If a command is taking too long, the cable subscriber should be able to issue another command. In the sequence diagrams, when a cable subscriber presses a remote control button while a spoken command is being processed, the spoken command is preempted, where possible, to give control back to the cable subscriber. A detailed description of where preemption is possible and which part of the system is responsible for the preemption accompany the sequence diagrams.

Second, the system should be as consistent as possible. To accomplish this, it is necessary to minimize the race conditions in the underlying system. This can be done in at least two ways:

(1) Prevent the cable subscriber from issuing a second voice command until the STB receives an indication of whether the recognition for the first command was successful or not. This makes it highly probable that the application has received the first command and is executing it by the time the subscriber sees the recognition feedback. If the command still takes a long time to execute, there are two explanations, either there is a network problem between the engine and the application server executing the command, or the latency is in the application, not the speech recognition system. Network problems can be handled via the command sequencing described below. Applications where there can be long latencies should already have built-in mechanisms to deal with multiple requests being processed at the same time. For example, it can take a long time to retrieve a web page, and the web browser would be prepared to discard the first request when a second request arrives.

(2) Require applications to sequence the execution of commands as follows. If the cable subscriber issues commands in the order spoken command (A), followed by button command (B), and the application receives them in the order A, B, both commands are executed. If the application receives them in the order B, A, command B is executed, and when command A arrives, it is discarded because it is obsolete.

FIG. 3A through FIG. 3E are sequence diagrams showing the points in time where a second command may be issued and describing what should happen when the second command is issued.

Figure 3A:
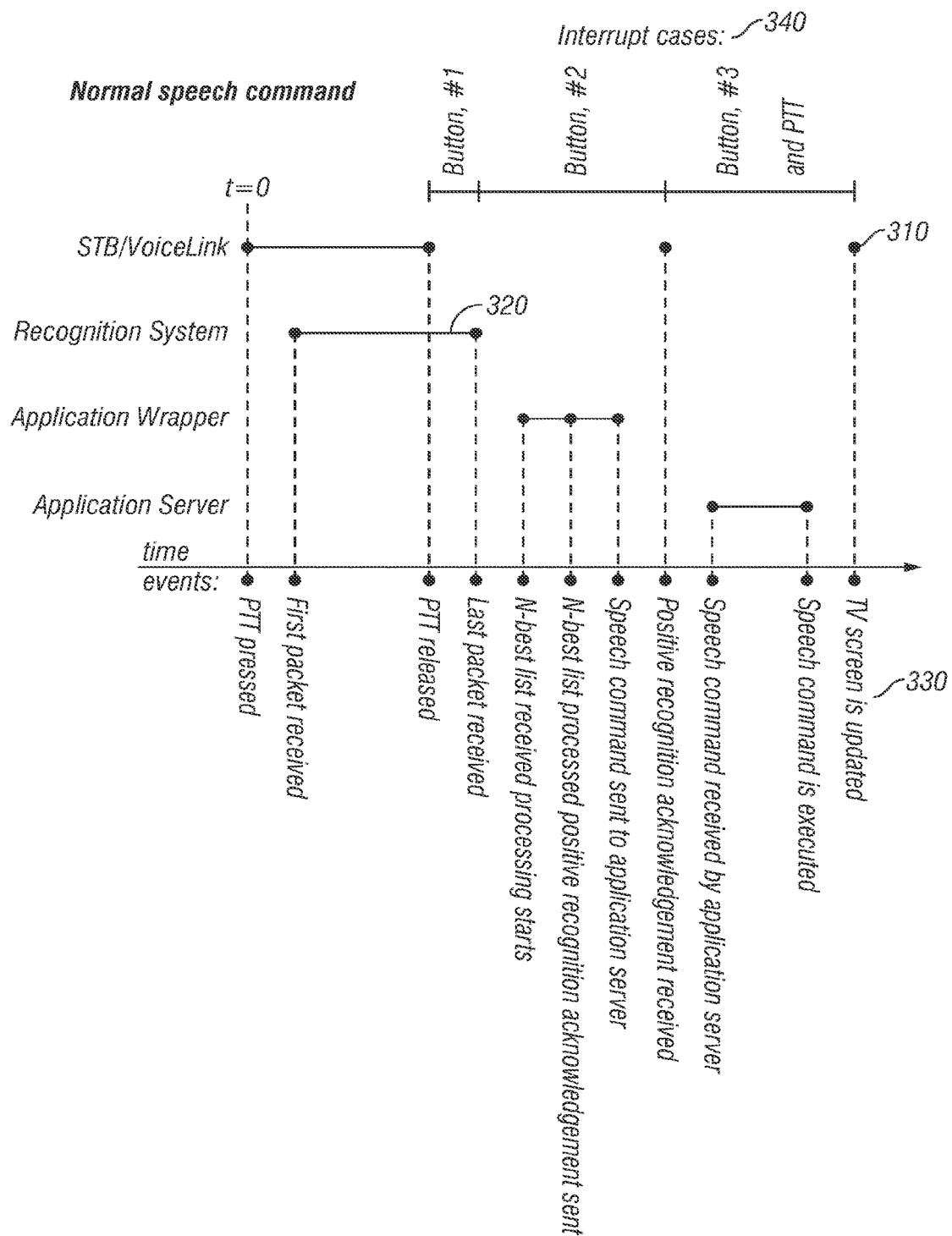
FIG. 3A is a sequence diagram showing the timeline of a normal spoken command.

FIG. 3A shows the timeline of a normal spoken command. The round dots 310 are events. A bar 320 that spans events indicates activity. For example, the bar between push-to-talk (PTT) button pressed and PTT button released indicates that the PTT button is depressed and speech packets are being generated. The labels on the left side of the diagram indicate the components in the system. STB/VoiceLink refers to the input system including the set-top-box 130, the remote control 110, and the receiver 120 as illustrated in FIG. 1.

The application wrapper and the application server are listed as separate components. When the entire application resides on the engine, the wrapper and the server are the same component, and command sequencing is easier.

A dot on the same horizontal line as the name of the component means that the event occurred in this component. The labels 330 on the bottom of the diagram describe the events that have occurred. The events are ordered by the time they occurred.

There are four cases where a button or spoken command can be issued while another command is already in progress. These are shown under the label "Interrupt cases" 340 at the top right of the diagram. The rest of the diagrams (FIGS. 3B-3E) describe what happens in each of these cases.

Figure 3B:
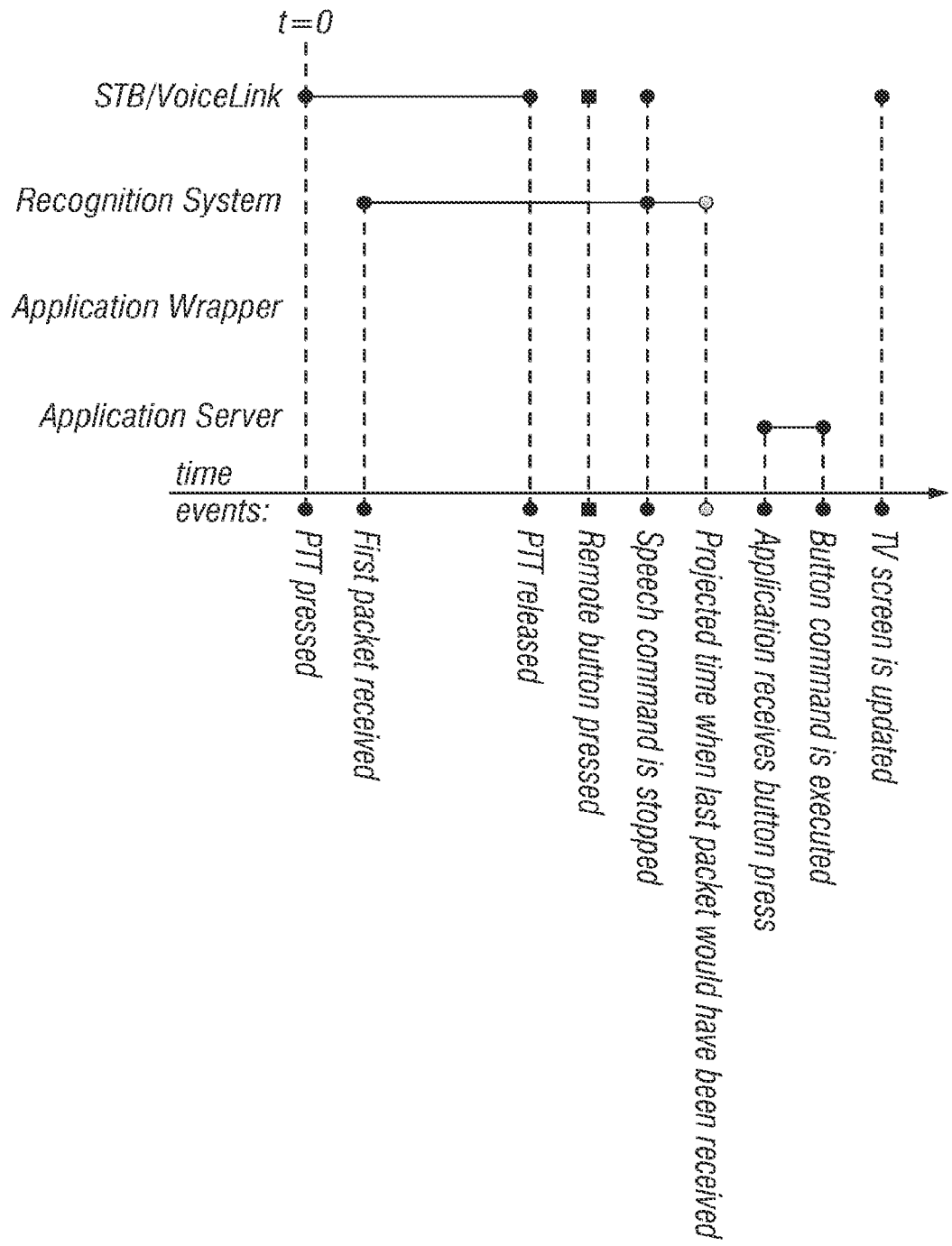
FIG. 3B is a sequence diagram showing the time line when the spoken command is interrupted by a button input (case 1)

FIG. 3B shows the time line when the spoken command is interrupted by a button input (case #1). In this case, the cable subscriber pushed a remote control button before the STB/Voice Link sent all of the packets for the spoken command to the Recognition System. The diagram shows that the spoken command is cancelled and the remote control button command is executed. The STB/Voice Link and the Recognition System should cooperate to cancel the spoken command.

FIG. 3C shows the time line when the spoken command is interrupted by a button input (case #2). In this case, the cable subscriber presses a remote control button after the last packet is received by the recognition system and before the n-best list is processed by the application wrapper. In both situations, the spoken command is discarded and the button command is executed. This diagram shows that the STB/VoiceLink and the Recognition System could have cooperated to cancel the spoken command in sub-case A, and the application would not have had to be involved. In sub-case B, the application cancels the spoken command because it arrived out of sequence.

Figure 3D:
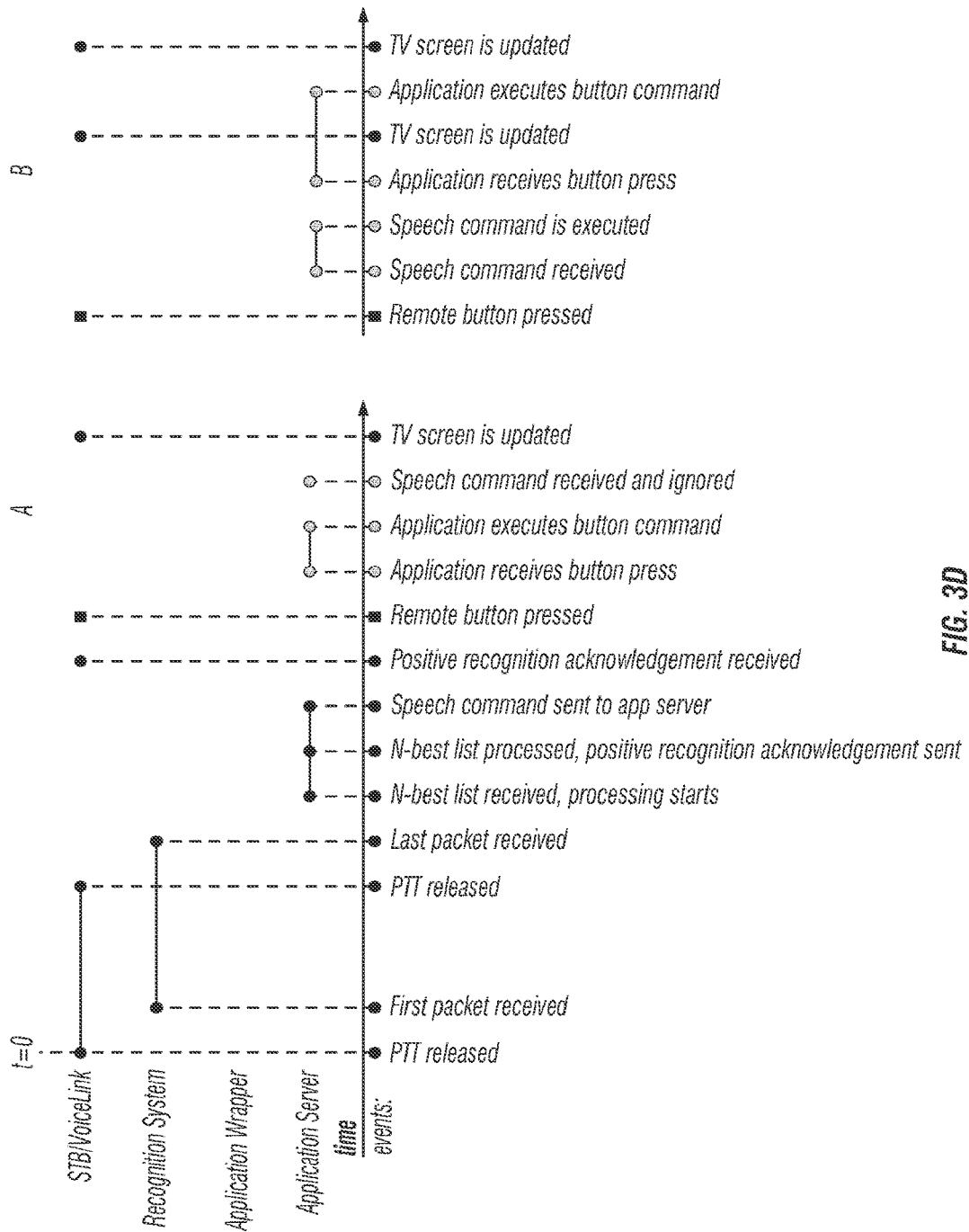
FIG. 3D is a sequence diagram showing the time line when the spoken command is interrupted by a button input (case 3)

FIG. 3D shows the time line when the spoken command is interrupted by a button input (case #3). In this case, the cable subscriber pressed a remote control button after the positive recognition acknowledgement was received and before the spoken command was executed. It is the application's responsibility to determine which of the two commands to execute. In sub-case A the spoken command is received out of sequence, and it is ignored. In sub-case B, the spoken command is received in order, and both the spoken command and the remote control button command are executed.

Figure 3E:
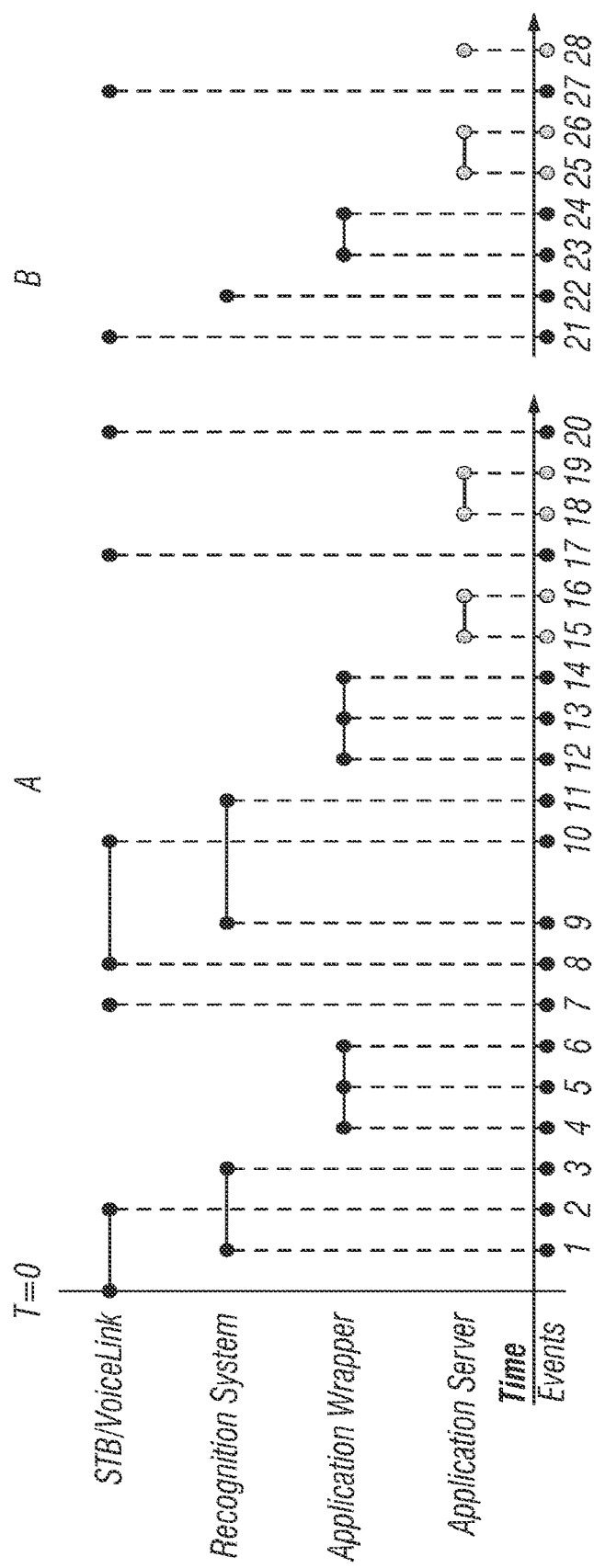
FIG. 3E is a sequence diagram showing the time line in a case where execution of a spoken command is interrupted by a new speech input.

FIG. 3E shows the time line in a case where the spoken command is interrupted by a speech input. The cable subscriber issues a second spoken command after the positive recognition acknowledgement was received and before the first spoken command was executed. It is the application's responsibility to determine which of the two commands to execute. In sub-case A the spoken commands are received in order and both commands are executed. In sub-case B, the spoken commands are received out of order, the second command is executed, and the first command is ignored.

Help Overlay

The help overlay displays a short, context-sensitive list of frequently used spoken commands for each unique screen of every speech-enabled application. The help overlay is meant to accomplish two goals: First, providing hints to new users to allow them to control basic functionality of a particular speech-enabled application; and second, providing a reminder of basic commands to experienced users in case they forget those commands. In addition to displaying application-specific commands, the help overlay always shows the commands for accessing the main menu overlay and "more help" from the user center. Also, the help overlay explains the speakable text indicator, if it is activated. Note that the help overlay helps the cable subscriber use and spoken commands. It does not describe application functionality.

Figure 4:
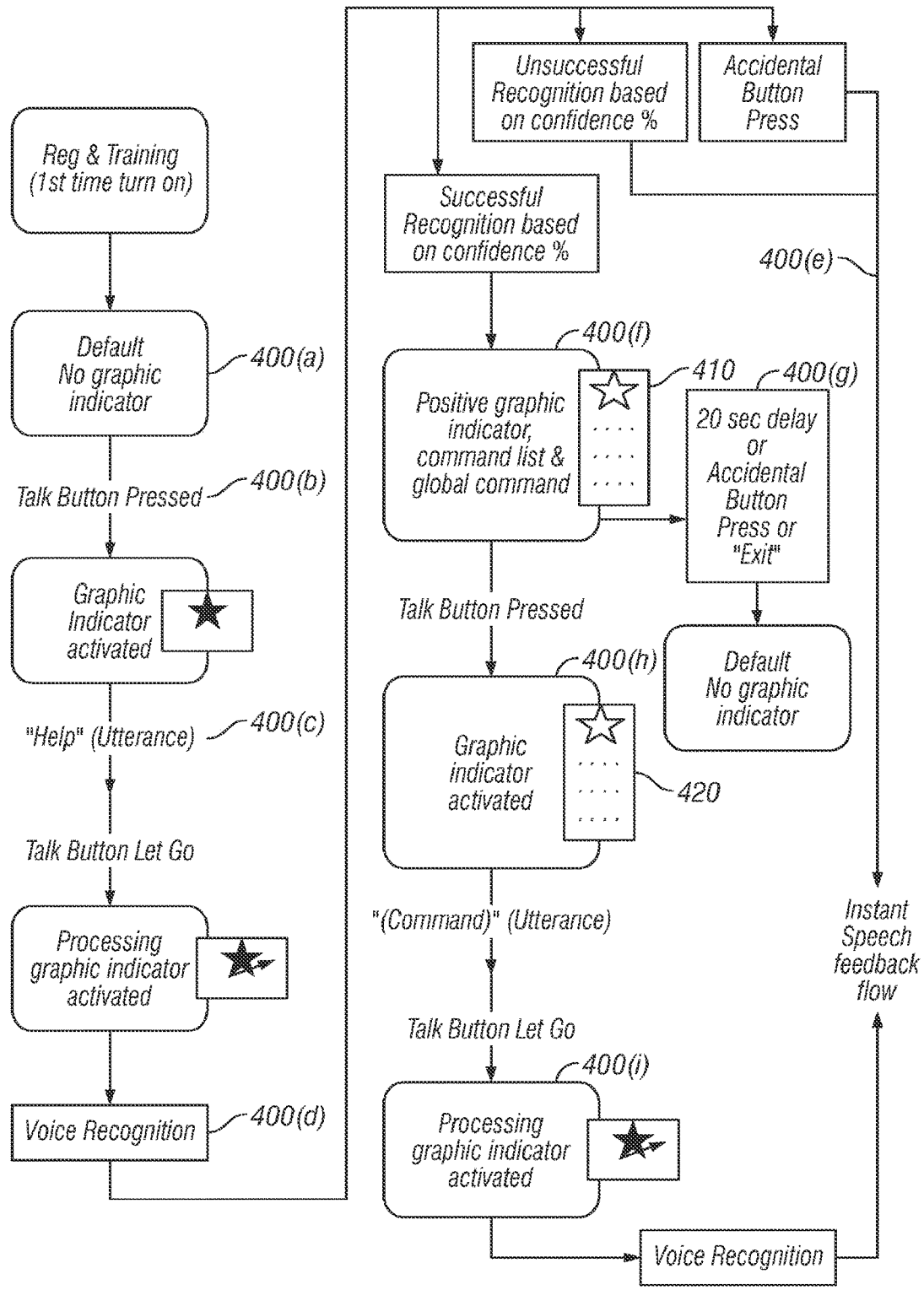
FIG. 4 is a flow diagram illustrating a process by which the help overlay appears and disappears.

The help overlays are organized as follows:
 Application-specific commands (approximately five basic commands)
 "More help" command (link to the user center)
 "Main Menu" command to display main menu overlay
 "Exit" to make overlay disappear FIG. 4 is a flow diagram illustrating a process by which the help overlay appears and disappears. The process includes the following steps:

400(*a*): Displaying a first help overlay if the speech recognition is successful. The first help overlay 410 is a dialog box which includes (1) a tab signaling a positive speech recognition—for example it may be a green check mark overlaid on a non-highlighted brand logo; (2) a text box for textual help information, which may further include a "more help" link and speakable text; and (3) virtual buttons—one for main menu and the other one for exit to make the overlay disappear. The first help overlay might stay on the screen for a first interval, for example, twenty seconds.

400(*b*): Removing the first help overlay 410 from the screen if (1) the first interval lapses; (2) any button of the remote control device is accidentally pressed; or (3) the exit button is selected.

400(*c*): Displaying a second help overlay 420 while the push-to-talk button is being pressed to give a new speech input. Structurally, the help overlay 420 is same as the help overlay 410. The only difference is that the immediate feedback tab in the help overlay 420 signals push-to-talk activation rather than a positive recognition as in the help overlay 410.

Feedback Overlays

There are two types of Feedback Overlays: Recognition Feedback Overlays and Application Feedback Overlays. Recognition Feedback Overlays inform the cable subscriber that there has been a problem with speech recognition. Application Feedback Overlays inform the cable subscriber about errors or problems related to the application's speech interface. Recognition Feedback Overlays exist in three states and respond to several different conditions. The three different Recognition Feedback states correspond to a number of unsuccessful recognitions that occur sequentially. This behavior occurs when the cable subscriber tries multiple times to issue a command which is not recognized by the system; the three states offer progressively more feedback to the cable subscriber with each attempt. The response to each attempt would include links to escalating levels of help.

The three recognition feedback states are: (1) the first unsuccessful recognition—the immediate speech feedback indicator changes to a question mark which provides minimal, quickly understand feedback to the cable subscriber; (2) the second unsuccessful recognition—the feedback overlay is displayed with a message and link to the help overlay; and (3) the third unsuccessful recognition—the feedback overlay is displayed with another message and links to the help overlay and more help in the user center.

The different recognition feedback conditions that correspond to the amount of information that the recognizer has about the cable subscriber's utterance and to the latency in the underlying system include:

Low confidence score. A set of generic "I don't understand" messages is displayed.

Medium confidence score. A list of possible matches may be displayed.

Sound level of utterance too low. The "Speak more loudly or hold the remote closer" message is displayed.

Sound level of utterance too high. The "Speak more softly or hold the remote farther away" message is displayed.

Talking too long. In the preferred embodiment, there is a ten second limit to the amount of time the push-to-talk button may be depressed. If the time limit is exceeded, the utterance is discarded and the "Talking too long" message is displayed.

Push-to-talk button stuck. If the push-to-talk button has been depressed, for example, for twenty seconds, the "push-to-talk button stuck" message is displayed.

Processing too long. As described in 200(*h*) above, if the remote control and the STB are unable to transfer an utterance to the head-end within, for example, five seconds after the push-to-talk button is released, the "Processing too long" message is displayed.

Application Feedback Overlays are displayed when application-specific information needs to be communicated to the cable subscriber. A different indicator at the top of the overlay (for example, tab 214) differentiates Application Feedback from Recognition Feedback. Application Feedback would include response or deficiency messages pertaining to the application's speech interface.

Main Menu Overlays

In the preferred embodiment, the main menu overlay provides a list of speech-enabled digital cable services that are available to the cable subscriber. The main menu overlay is meant to be faster and less intrusive than switching to a separate screen to get the same functionality. The service list may, for example, include: (1) "Watch TV" for full screen TV viewing; (2) "Program Guide"; (3) "Video on Demand"; (4) "Walled Garden/Internet"; and (5) "User Center." The current service is highlighted. Additional commands displayed include "Exit" to make overlay disappear.

Figure 5:
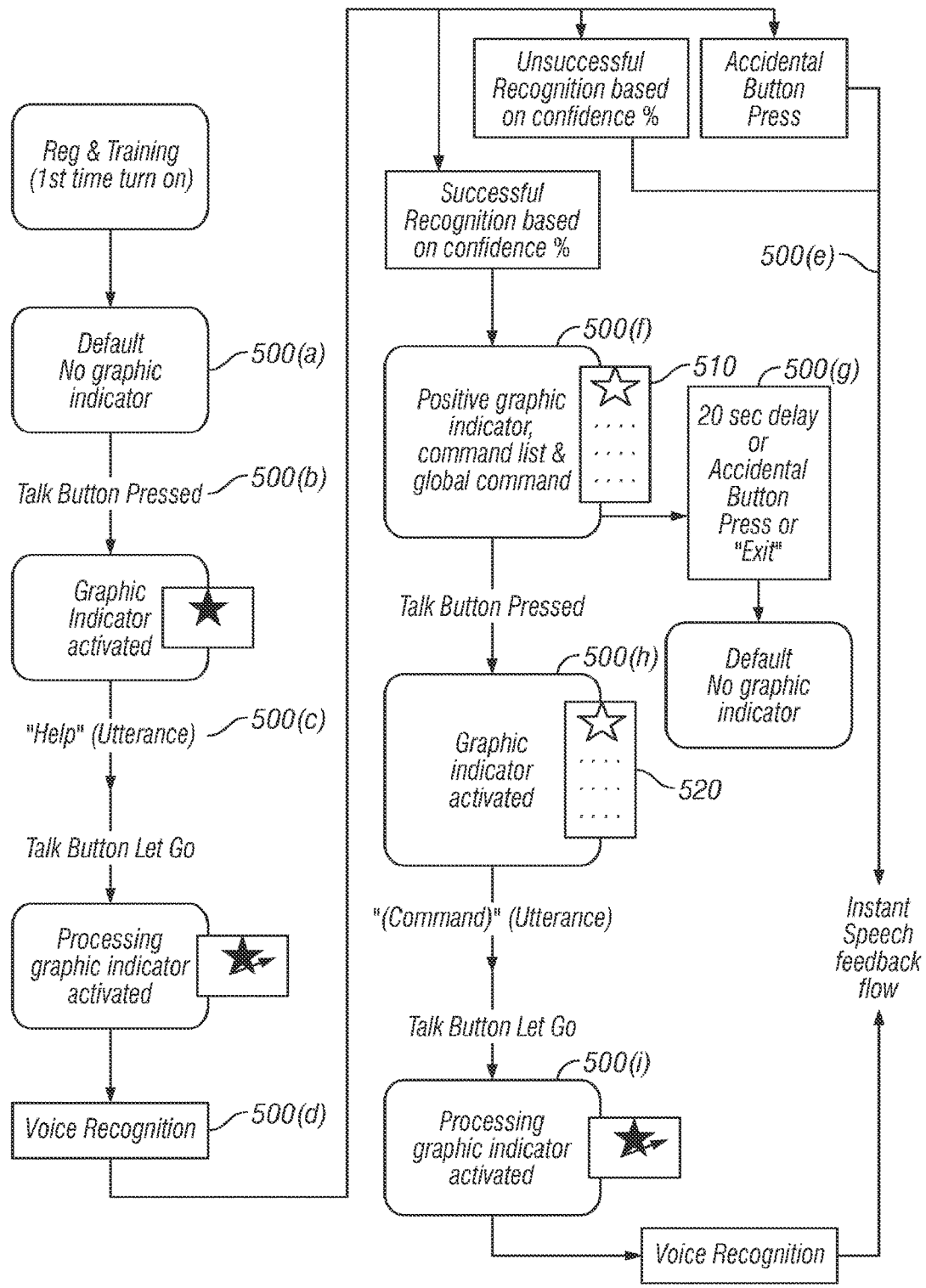
FIG. 5 is a flow diagram illustrating a process by which the main menu overlay appears and disappears.

FIG. 5 is a flow diagram illustrating the process by which the menu overlay appears and disappears. The process includes the following computer-implemented steps:

500(*a*): Displaying a first main menu overlay if the speech recognition is successful. The first main menu overlay 510 is a dialog box which includes (1) a tab signaling a positive speech recognition—for example it may be a green check mark overlaid on a non-highlighted brand logo; (2) a text box for textual information about the main menu, which may further includes speakable text; and (3) one or more virtual buttons such as the help button and the exit button. The main menu overlay stays on the screen for a first interval, perhaps 20 seconds for example.

500(*b*): Removing the first main menu overlay 510 from the screen if (1) the first interval lapses; (2) any button of the remote control is accidentally pressed; or (3) the exit button is selected.

500(*c*): Displaying a second main menu overlay 520 while the push-to-talk button is being pressed to give a new speech input for navigation. Structurally, the second main menu overlay 520 is same as the first main menu overlay 510. The only difference is that the immediate feedback tab in the second main menu overlay 520 signals push-to-talk activation rather than a positive recognition as in the first main menu overlay 510.

Speakable Text Indicator

The Speakable Text Indicator appears to be layered above speech-enabled applications as a part of the GSUI. This treatment may apply to static or dynamic text. Static text is used in labels for on-screen graphics or buttons that may be selected by moving a highlight with the directional keys on the remote control. As such, most screens usually have several text-labeled buttons and therefore require a corresponding number of speakable text indicators. Dynamic text is used in content such as the list of movies for the Video on Demand (VOD) application. Each line of dynamic text may include speakable text indicators to indicate which words are speakable. The speakable text indicator is currently a green dot, and may be changed to a different indicator. It is important that the indicator be visible but not distracting.

Additionally, the cable subscriber should have the ability to turn the speakable text Indicators on and off.

Television Screen Interface—Graphic User Interface (GUI)

The GSUI overlays described above are created from a set of toolkit elements. The toolkit elements include layout, brand indicator, feedback tab, dialog box, text box, typeface, background imagery, selection highlight, and speakable text indicator.

The multiple system operator (MSO) has some flexibility to specify where the GSUI should appear. The GSUI is anchored by the immediate speech feedback tab, which should appear along one of the edges of the screen. The anchor point and the size and shape of the dialog boxes may be different for each MSO.

The brand identity of the service provider or the system designer may appear alone or in conjunction with the MSO brand identity. Whenever the brand identity appears, it should be preferably consistent in location, size and color treatment. The static placement of the brand indicator is key in reinforcing that the GSUI feedback is coming from the designer's product. Various states of color and animation on the brand indicator are used to indicate system functionality. Screens containing the brand indicator contain information relative to speech recognition. The brand indicator has various states of transparency and color to provide visual clues to the state or outcome of a speech request. For example: a 40% transparency indicator logo is used as a brand indication, which appears on all aspects of the GSUI; a solid indicator logo is used to indicate that the remote's push-to-talk button is currently being pressed; and a 40% transparency flashing indicator logo is used to indicate that the system heard what the user said and is processing the information. A brand indicator may be placed anywhere on the screen, but preferably be positioned in the upper left corner of the screen and remain the same size throughout the GSUI.

The feedback tab is the on-screen graphical element used to implement immediate speech feedback as described above. The feedback tab uses a variety of graphics to indicate the status and outcome of a speech request. For example: a green check mark overlaid on the brand indicator might indicate "Positive Speech Recognition Feedback"; a red question mark overlaid on the brand indicator might indicate "Misrecognition Speech Feedback"; a 40% transparency flashing brand indicator logo might indicate "Speech Recognition Processing"; a solid brand indicator logo might indicate "Push to Talk Button Activation"; a yellow exclamation point overlaid on the brand indicator logo might indicate "Application Alert"; a prohibition sign overlaid on the brand indicator logo might indicate "Non-speech Enabled Alert". The presently preferred tab design rules include: (1) any color used should be consistent (for example, R: 54, G: 152, B: 217); (2) it should always have a transparent background; (3) it should always be consistently aligned, for example, to the top of the TV screen; (4) the size should always be consistent, for example, 72 w×67 h pixels; (5) the brand indicator should always be present; (6) the bottom corners should be rounded; (7) the star and graphic indicators should be centered in the tab.

The dialog box implements the Feedback Overlay, Help Overlay, Main Menu Overlay, and Command List Overlay described above. The dialog box is a bounded simple shape. It may contain a text box to convey information associated with the service provider's product. It may also contain virtual buttons that can be selected either by voice or by the buttons on the remote control. Different dialog boxes may use different sets of virtual buttons. When two different dialog boxes use a virtual button, it should preferably appear in the same order relative to the rest of the buttons and have the same label in each dialog box.

Figures 6A, 6B:
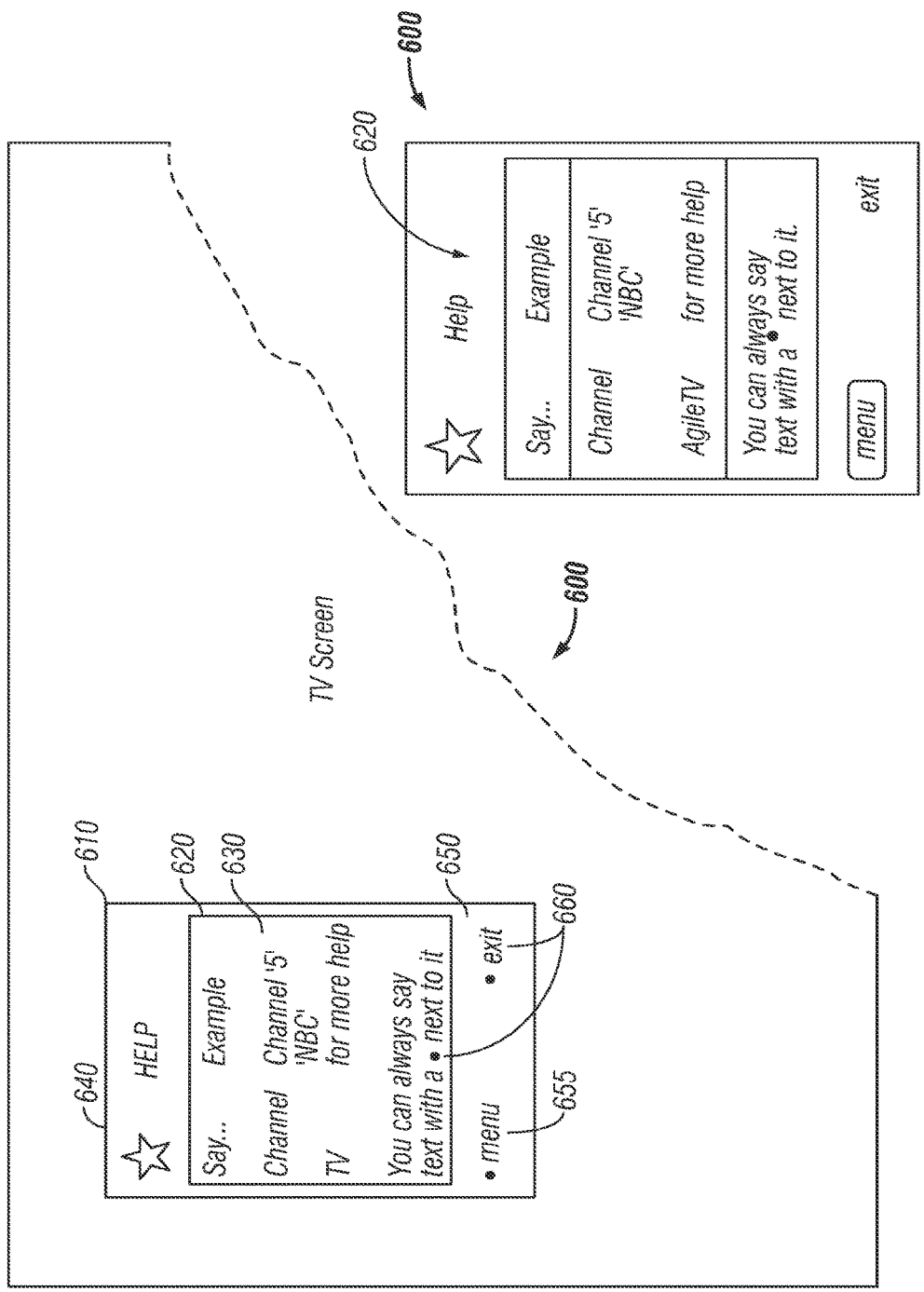
FIG. 6A is a graphic diagram illustrating an exemplary help overlay dialog box used in the TV screen user interface.
FIG. 6B is a screen capture showing the appearance of the help overlay dialog box illustrated in FIG. 6A.

Illustrated in FIG. 6A is an exemplary help dialog box 600. FIG. 6B is a screen capture showing the appearance of the help dialog box illustrated in FIG. 6A. The dialog box 600 includes a background box 610 used to display graphic and textual information, a text box 630 used to display textual information, a brand indicator logo 640, and virtual buttons 650 and 655. The text box 630 is overlaid on the background box 610. The presently preferred dialog box design rules include: (1) the dialog box should always flush align to the top of the TV screen; (2) the bottom corners should be rounded; (3) service provider's Background Imagery should always be present; (4) the box height can fluctuate, but width should stay consistent; and (5) the box should always appear on the left side of the TV screen.

The text box 630 conveys information associated with the provider's product. This information should stand out from the background imagery 620. To accomplish this, the text box 630 is a bounded shape placed within the bounded shape of the background box 610. In a typical embodiment, the textual information in the text box 630 is always presented on a solid colored blue box, which is then overlaid on the background box 610. There can be more than one text box per dialog box. For example, the main menu overlay contains one text box for each item in the main menu. Secondary navigation, such as the "menu" button 655 and "exit" button 650, can be displayed outside the text box on the dialog box background imagery. The presently preferred text box 630 design rules include (1) the color should always be R: 42, G: 95, B: 170; (2) the text box should always sit eight pixels in from each side of the Dialog box; (3) all corners should be rounded; and (4) all text within a text box should be flush left.

Use of a single font family with a combination of typefaces helps reinforce the brand identity. When different typefaces are used, each should be used for a specific purpose. This helps the cable subscriber gain familiarity with the user interface. Any typeface used should be legible on the TV screen.

The background imagery 620 is used to reinforce the brand logo. The consistent use of the logo background imagery helps brand and visually indicate that the information being displayed is part of the speech recognition product.

The selection highlight is a standard graphical element used to highlight a selected item on-screen. In a typical embodiment, it is a two pixel, yellow rule used to outline text or a text box indicating that it is the currently selected item.

The speakable text indicator is a preferably a consistent graphical element. It should always keep the same treatment. It should be placed next to any speakable text that appears on-screen. In a preferred embodiment, the speakable text indicator is a green dot. The green dot should be consistent in size and color throughout the GSUI and in all speech-enabled applications. Perhaps the only exception to this rule is that the green dot is larger in the help text about the green dot itself.

The feedback tab is the graphic element used for immediate speech feedback. This element appears on top of any other GSUI overlay on screen. For example, if the help overlay is on screen, and the cable subscriber presses the push-to-talk button, the push-to-talk button activation tab, i.e. the solid logo image, appears on top of the help overlay.

The help overlay contains helpful information about the speech user interface and menu and exit buttons. The visual design of the help overlay is a dialog box that uses these graphical elements: brand indicator, text box, background imagery, typeface and menu highlight, as well as a dialog box title indicating which service the Help is for. The content in the text box changes relative to the digital cable service being used. The help overlay should never change design layout but can increase or decrease in length according to text box needs.

The feedback overlay is displayed upon misrecognition of voice commands. The presently preferred visual design of the feedback overlay is a dialog box that uses the following graphical elements: brand indicator, text box, background imagery, typeface and menu highlight, as well as a dialog box title indicating which service the feedback is for. The feedback overlay should never change design layout but can increase or decrease in length according to text box needs.

The main menu overlay is a dialog box that contains a dialog box title, buttons with links to various digital cable services and an exit button. The presently preferred main menu uses the following graphical elements: dialog box, background imagery, typeface, menu highlight, and text box. Each selection on the main menu is a text box.

Navigation

The GSUI incorporates various navigation functions. For example, the user navigates on-screen list based information via speech control. List based information may be manipulated and navigated various ways including commands such as: "go to letter (letter name)" and "page up/down". Items in lists of movies and programs may also be accessed in random fashion by simply speaking the item name. When viewing a movie list, the user may simply say a movie name within that list and be linked to the movie information screen.

For another example, the user may navigate directly between applications via spoken commands or speech-enabled main menu. The user may also navigate directly to previously "book marked" favorite pages.

For another example, the user may initiate the full screen program navigation function, which enables the user to perform the following:

(1) Navigate, search, filter and select programs by spoken command. This functionality is similar to many features found in interactive program guides but is accessible without the visual interface thus allowing less disruptive channel surfing experience.

(2) Initiate via speech control an automatic "scan" type search for programs within categories or genres. For example, user says "scan sports" to initiate automatic cycle of sports programming. Each program would remain on screen for a few seconds before advancing to next program in the category. When the user finds something he wants to watch, he may say "stop". Categories include but are not limited to sports, children, movies, news, comedy, sitcom, drama, favorites, reality, recommendations, classic etc. Feature is available as a means to scan all programs without segmentation by category.

(3) Add television programs or channels to the categories such as "favorites"; edit television programs or channels in the categories; and delete television programs or channels from the categories. The user may also set "parental control" using these "add", "edit", and "delete" functions.

(4) Search, using spoken commands, for particular programs based on specific attributes. For example, "Find Sopranos", "Find movie by Coppola", etc.

(5) Filter, using spoken commands, groups of programs by specific attributes such as Genre, Director, Actor, Rating, New Release, Popularity, Recommendation, Favorites, etc. For example, "Find Action Movies" or "Show me College Football", etc.

Interactive Program Guide Control

One deployment of the GSUI is for the speech-enabled interactive program guide (IPG), which is the application that the cable subscriber uses to find out what is on television. IPG supports various functionalities. It enables the user to do the following via spoken commands:

(1) Access detailed television program information. For example, with program selected in guide or viewed full screen, the user issues command "Get Info" to link to the program information screen.

(2) Sort programs by category. For example, with IPG active, the user issues command "Show Me Sports". Additional categories include Favorites, Movies, Music, News, etc.

(3) Access and set parental controls to restrict children's ability to view objectionable programming.

(4) Access and set reminders for programs to play in the future. For example, with IPG active, the user issues command "Go to Friday 8 PM", and then with program selected, issues command "Set Reminder".

(5) Search programs based on specific criteria. For example, with IPG active, the user issues command "Find Monday Night Football" or "Find Academy Awards".

(6) Complete pay-per-view purchase.

(7) Upgrade or access premium cable television services.

Video on Demand Service

Another deployment of the GSUI is for the Video on Demand (VOD), which functions as an electronic version of a video store. The GSUI provides a streamlined interface where many common functions can be performed more easily by spoken commands. The VOD application enables the user to do the following via spoken commands:

(1) Access detailed movie information.

(2) Sort by genre including but not limited to Action, Children, Comedy, Romance, Adventure, New Release, etc.

(3) Set parental control to restrict children's access to controlled video information.

(4) Search by movie title, actor, awards, and recommendations, etc.

(5) Get automatic recommendation based on voiceprint identification.

(6) Navigate on Internet.

Other Functions

The GSUI may further incorporate functionalities to enable the user to perform the following via spoken commands:

(1) Initiate instant messaging communication.

(2) Access and play games.

(3) Control all television settings including but not limited to volume control, channel up/down, color, brightness, picture-in-picture activation and position.

(4) Control personal preferences and set up options.

(5) Link to detailed product information, such as product specification, pricing, and shipping etc., based on television advertisement or banner advertisement contained within application screen.

(6) Receive advertisement or banners based on voiceprint identification.
(7) Receive programming recommendations based on voiceprint identification.
(8) Receive personalized information based on voiceprint identification.
(9) Get automatic configuration of preferences based on voiceprint identification.
(10) Complete all aspects of purchase transaction based on voiceprint identification (also called "OneWord" transaction).
(11) Initiate a product purchase integrated with broadcast programming. For example, the user's "buy now" command while viewing QVC initiates the purchase procedure.
(12) Control home services such as home security, home entertainment system and stereo, and home devices such as CD, Radio, DVD, VCR and PVR via TV based speech control interface.

Speech Control—Commands and Guidelines

Each spoken command is processed in a context that includes commands to access any content named on the screen the cable subscriber is viewing, commands to access application features, commands to access the Global Speech User Interface (GSUI), commands to simulate remote control button presses, and commands to navigate to other applications. Many of the guidelines described herein were developed to try to minimize the potential for words or phrases from one source to become confused with those from another. For example, the content in the Interactive Program Guide (IPG) application contains the names of television shows. There could easily be a television show named "Exit" which would conflict with using "exit" as the speech equivalent of pressing the exit button on the remote control. The specification for a command describes the way it fits into the environment.

The presently preferred specification includes the command's: (1) Scope, which characterizes when the command is available; (2) Language, which defines the words cable subscribers use to invoke the command; and (3) Behavior, which specifies what happens when the command is invoked.

Global commands are always available. Applications may only disable them to force the user to make a choice from a set of application-specific choices. However, this should be a rare occurrence. Speech interfaces are preferably designed to make the cable subscriber feel like he or she is in control. It is highly desirable for the navigation commands to be speech-enabled and available globally. This allows cable subscribers to move from one application to another via voice. When all of the applications supported by an MSO are speech-enabled, both the navigation commands and the GSUI commands become global. The GSUI commands are always available for speech-enabled applications.

The navigation commands are preferably always available. The navigation commands include specific commands to allow cable subscribers to go to each application supported by the MSO and general commands that support the navigation model. For example, "Video On Demand" is a specific command that takes the cable subscriber to the VOD application, and "last" is a general command that takes the cable subscriber to the appropriate screen as defined by the navigation model. The language for the navigation commands may be different for each MSO because each MSO supports a different set of applications. The navigation model determines the behavior of the navigation commands. There may be an overall navigation model, and different navigation models for different applications. Where navigation models already exist, navigation is done via remote control buttons. The spoken commands for navigation should preferably be the same as pressing the corresponding remote control buttons. When a screen contains virtual buttons for navigation and the cable subscriber invokes the spoken command corresponding to the virtual button, the virtual button is highlighted and the command invoked.

The scope for remote control buttons varies widely. Some remote control buttons are rarely used in any application, for example, the "a", "b", and "c" buttons. Some are used in most applications, for example, the arrow keys. Because recognition can be improved by limiting choices, it is preferred that each context only include spoken commands for applicable remote control buttons. The behavior of the spoken commands for remote control buttons keeps the same as pressing the remote control buttons. However, when a screen contains virtual buttons that represent buttons on the remote control and the cable subscriber invokes the spoken command corresponding to a virtual button, the virtual button is highlighted and the command invoked.

Cable subscribers should rarely be forced to say one of the choices in a dialog box. The global commands are preferably always available unless the cable subscriber is forced to say one of the choices in a dialog box. This should be a rare event. People commonly say phrases such as "Show me" or "Go to" before they issue a command. Application-specific commands should include these phrases to make applications more comfortable to use and more in keeping with continuous or natural language.

Although the invention is described herein with reference to the preferred embodiment, one skilled in the art will readily appreciate that other applications may be substituted for those set forth herein without departing from the spirit and scope of the invention. For example, while the invention herein is described in connection with television services, those skilled in the art will appreciate that the invention also comprises any representational form of information with which a user interacts such as, for example, browser enabled technologies and would include the World Wide Web and information network access.

Accordingly, the invention should only be limited by the Claims included below.

What is claimed is:

1. A system for enabling a user to select media content in an entertainment environment, said system comprising:
a remote control device comprising:
a set of user activated keys adapted to execute functions of the entertainment environment;
a microphone for receiving user speech;
coupled to the microphone, a speech activation circuit adapted to enable a speech signal; and
coupled to the speech activation circuit, a transmitter adapted to transmit the speech signal from the remote control device;
coupled to the remote control device, a speech engine comprising a speech recognizer configured to receive the speech signal, an application wrapper configured to recognize substantive meaning embodied in the speech signal, and output commands for enabling selection of media content when substantive meaning is recognized; and
coupled to the speech engine, a media content controller configured to receive commands representing the recognized substantive meaning, to select media content, and to use selected media content in the entertainment environment; wherein:

every function that can be executed by activation of the user activated keys can also be executed by the speech engine in response to the recognized substantive meaning;

the speech engine provides user visual indications responsive to the speech signal; and the user visual indications comprise at least one overlay on a display screen, said overlay from the group of items consisting of:

a dialog box;

a list of context-sensitive spoken commands;

a list of digital cable services available to the user.

2. A system for enabling a user to select media content in an entertainment environment said system comprising:

a remote control device comprising:

a set of user activated keys adapted to execute functions of the entertainment environment;

a microphone for receiving user speech;

coupled to the microphone, a speech activation circuit adapted to enable a speech signal; and coupled to the speech activation circuit a transmitter adapted to transmit the speech signal from the remote control device;

coupled to the remote control device, a speech engine comprising a speech recognizer configured to receive the speech signal, an application wrapper configured to recognize substantive meaning embodied in the speech signal, and output commands for enabling selection of media content when substantive meaning is recognized; and coupled to the speech engine, a media content controller configured to receive commands representing the recognized substantive meaning, to select media content, and to use selected media content in the entertainment environment; wherein:

every function that can be executed by activation of the user activated keys can also be executed by the speech engine in response to the recognized substantive meaning; and the application wrapper provides a binary indication denoting whether or not substantive meaning has been successfully recognized in the speech signal.

3. The system of claim 2, wherein the indication is a visual indication.

4. The system of claim 3, wherein the visual indication comprises text.

5. A method for selecting media content in an entertainment environment, said method comprising:

receiving user speech and generating a speech signal in response to the user speech;

determining and displaying a user feedback message corresponding to the generated speech signal; and selecting and using media content in the entertainment environment based upon the generated speech signal; wherein:

the feedback message comprises one of three levels, the three levels corresponding to progressively more detailed feedback imparted to the user, said three levels presented to the user based upon sequentially occurring first, second, and third unsuccessful speech recognitions, respectively.

6. The method of claim 5, wherein:

a microphone is activated by the user prior to the step of receiving user speech; and said three levels are presented to the user in time succession.

7. The method of claim 5, further comprising the step of performing speech recognition on the generated speech signal.

8. The method of claim 5, wherein the step of selecting and using media content comprises determining media content using the generated speech signal when user speech is substantively recognized within the generated speech signal.

9. The method of claim 5, wherein the feedback message indicates that a recognition issue was encountered with the speech signal.

10. The method of claim 5, wherein:

the first level comprises a question mark;

the second level comprises a text message and a link to a help facility; and the third level comprises more help to the user than the second level.

11. The method of claim 5, wherein the feedback message comprises a visual indication.

12. The method of claim 11, wherein the visual indication comprises a list of possible matches associated with the generated speech signal.

13. The method of claim 11, wherein the visual indication comprises at least one overlay on a display screen.

14. A system for selecting media content in an entertainment environment, said system comprising:

means for receiving user speech and for generating a speech signal in response to the user speech;

coupled to the receiving and generating means, means for determining substantive meaning from the generated speech signal, and for displaying on a user display two distinct categories of feedback messages corresponding to the generated speech signal, where the two categories correspond to two distinct types of problems; and coupled to the determining and displaying means, means for selecting and using media content in the entertainment environment based upon the generated speech signal, wherein:

the first category comprises a recognition feedback message informing the user of a problem with recognizing substantive meaning; and the second category comprises an application feedback message informing the user regarding issues with selection and use of media content.

* * * * *